US012608569B2

(12) United States Patent
Minami

(10) Patent No.: US 12,608,569 B2
(45) Date of Patent: Apr. 21, 2026

(54) READING APPARATUS

(71) Applicant: Toshihiro Minami, Fujisawa (JP)

(72) Inventor: Toshihiro Minami, Fujisawa (JP)

( * ) Notice: Subject to any disclaimer, the term of this patent is extended or adjusted under 35 U.S.C. 154(b) by 0 days.

(21) Appl. No.: 19/246,658

(22) Filed: Jun. 23, 2025

(65) Prior Publication Data

US 2026/0017474 A1      Jan. 15, 2026

(30) Foreign Application Priority Data

| | | |
|---|---|---|
| Jul. 11, 2024 | (JP) | 2024-111525 |
| Aug. 4, 2024 | (JP) | 2024-128598 |
| Nov. 16, 2024 | (JP) | 2024-200155 |

(51) Int. Cl.
    *G06K 7/10*          (2006.01)
(52) U.S. Cl.
    CPC .............................. *G06K 7/10297* (2013.01)
(58) Field of Classification Search
    CPC .................................................. G06K 7/10297
    USPC ......................................................... 235/451
    See application file for complete search history.

(56) References Cited

U.S. PATENT DOCUMENTS

| | | | |
|---|---|---|---|
| 12,014,239 B2 | 6/2024 | Suzuki | |
| 2024/0095473 A1* | 3/2024 | Sakurai | H01Q 3/02 |
| 2024/0095474 A1* | 3/2024 | Sakurai | G06K 7/10009 |
| 2025/0132503 A1 | 4/2025 | Ninami | |

FOREIGN PATENT DOCUMENTS

| | | |
|---|---|---|
| JP | 2018190255 A | 12/2018 |
| JP | 7199097 B2 | 1/2023 |
| JP | 7429399 B1 | 2/2024 |
| JP | 7470953 B2 | 4/2024 |

* cited by examiner

*Primary Examiner* — Daniel A Hess

(57) ABSTRACT

A top part 110 includes a placement portion 111 and a prohibition portion 112. The placement portion 111 and the prohibition portion 112 are made of a material that allows radio waves to pass through. An article 300 to which an RF tag 301 is attached can be placed on the upper surface of the placement portion 111. The prohibition portion 112 surrounds the placement portion 111. An RF tag 301 is prohibited from being placed on the prohibition portion 112. The antenna for communicating with the RF tag 301 is below the placement portion 111. The antenna is located at a position where a radio wave with high intensity is radiated toward the placement portion 111 and the radio wave with lower intensity than that of the radio wave radiated toward the placement portion 111 is radiated toward the prohibition portion 112.

8 Claims, 29 Drawing Sheets

Radio wave radiated by
the antenna

700

711                                                          715

720

722        726

1

READING APPARATUS

CROSS-REFERENCE TO RELATED APPLICATION

This application is based upon and claims the benefit of priorities from Japanese Patent Application No. 2024-111525, filed on Jul. 11, 2024, Japanese Patent Application No. 2024-128598, filed on Aug. 4, 2024, and Japanese Patent Application No. 2024-200155, filed on Nov. 16, 2024, the entire contents of which are incorporated herein by reference.

FIELD

Embodiments described herein relate generally to an apparatus for reading information from a passive RF (Radio Frequency) tag.

BACKGROUND

The intensity of a radio wave received by an RF tag may be weakened depending on the direction of the RF tag relative to an antenna of an RFID (Radio Frequency Identification) reader/writer. For example, when the antenna of the RFID reader/writer radiates a circularly polarized radio wave, if the radio wave radiated by the antenna of the RFID reader/writer is weak and the longitudinal direction of an antenna of the RF tag is nearly perpendicular to the surface of the antenna of the RFID reader/writer, the RF tag may not be able to operate and may not be able to transmit information in response to the received radio wave. Furthermore, when multiple RF tags overlap each other, the intensity of the radio wave received by the RF tags may be weakened depending on their mutual position.

Also, for example, an RFID system is used for inventory management (inspection and stocktaking) of commodities in a factory, inspection and stocktaking of commodities in intermediate distribution, a self-checkout machine in a store, and the like. The radio wave used in this RFID system is generally in the UHF band of 860-960 MHz. At such relatively low frequencies, the radio wave goes around behind an obstacle due to diffraction when the radio wave is blocked by it.

Japanese Patent No. 7429399 discloses a reading apparatus that reads information from a passive RF tag. The reading apparatus comprise a housing that can contain an article to which the RF tag is attached. A top portion of the housing has an opening through which can take the article in and out of the housing. The reading apparatus reads information from the RF tag when the opening is open. Each of the left side portion, the back portion, and the right side portion in the housing includes a radio wave absorbing layer and is higher than the front portion. The interior of the housing is divided into an attenuation space between the front portion and the front housing limiting portion and a housing space between the front housing limiting portion and the back portion. In this case, the article to which the RF tag is attached can be put in the housing space, but the article cannot be put in the attenuation space. The bottom antenna is located on the upper surface of the bottom portion of the housing at a position where a radio wave with high intensity is radiated toward the housing space, and a radio wave with lower intensity than that of the radio wave radiated toward the housing space is radiated toward the attenuation space.

The radio wave radiated upward by the bottom antenna is diffracted at the upper end of the left side portion, the upper end of the back portion, and the upper end of the right side portion in the housing. However, the radio wave is attenuated when it reaches the upper end of the left side portion, the upper end of the back portion, and the upper end of the right side portion. When the left side portion, the back portion, and the right side portion are sufficiently high, the radio wave diffracted at their upper ends will be attenuated to the intensity that makes it impossible to read information from an RF tag outside the housing. Furthermore, the radio wave is greatly attenuated while propagating through the attenuation space. Therefore, this reading apparatus can prevent accidentally reading information from an RF tag outside the housing due to the diffraction of the radio wave at the peripheral edge of the opening.

However, the left side portion, the back portion, and the right side portion in the housing need to be at a height sufficient to prevent accidentally reading information from an RF tag outside the housing due to the diffraction of the radio wave at their upper ends when the radio wave radiated upward by the bottom antenna reaches their upper ends. As a result, this reading apparatus may be difficult to use because the left side portion, the back portion, and the right side portion may be too high.

DETAILED DESCRIPTION

Each reading apparatus for reading information from an RF tag according to each embodiment reduces the possibility of failing to read information from an RF tag above the reading apparatus, prevents accidentally reading information from an RF tag around the reading apparatus, and improves the ease of use of the reading apparatus. Each reading apparatus according to each embodiment will be described in detail with reference to the drawings below. In all the drawings illustrating the embodiments, common components are denoted by the same reference number and a repetitive description thereof will be omitted.

Figure 1:
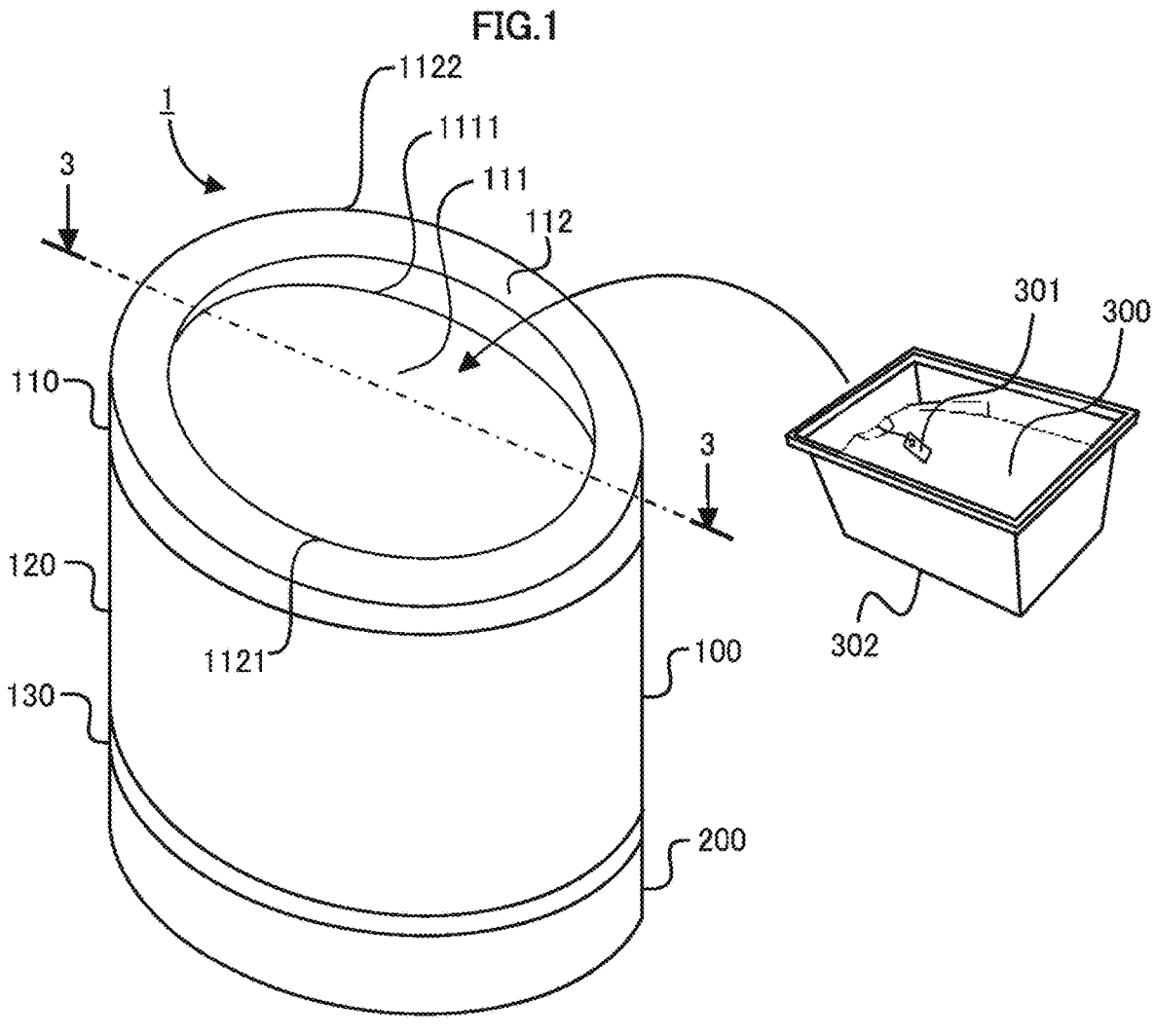
FIG. 1 is a perspective view of an example of a reading apparatus for reading information from an RF tag according to the first embodiment of the present disclosure.
Figure 2:
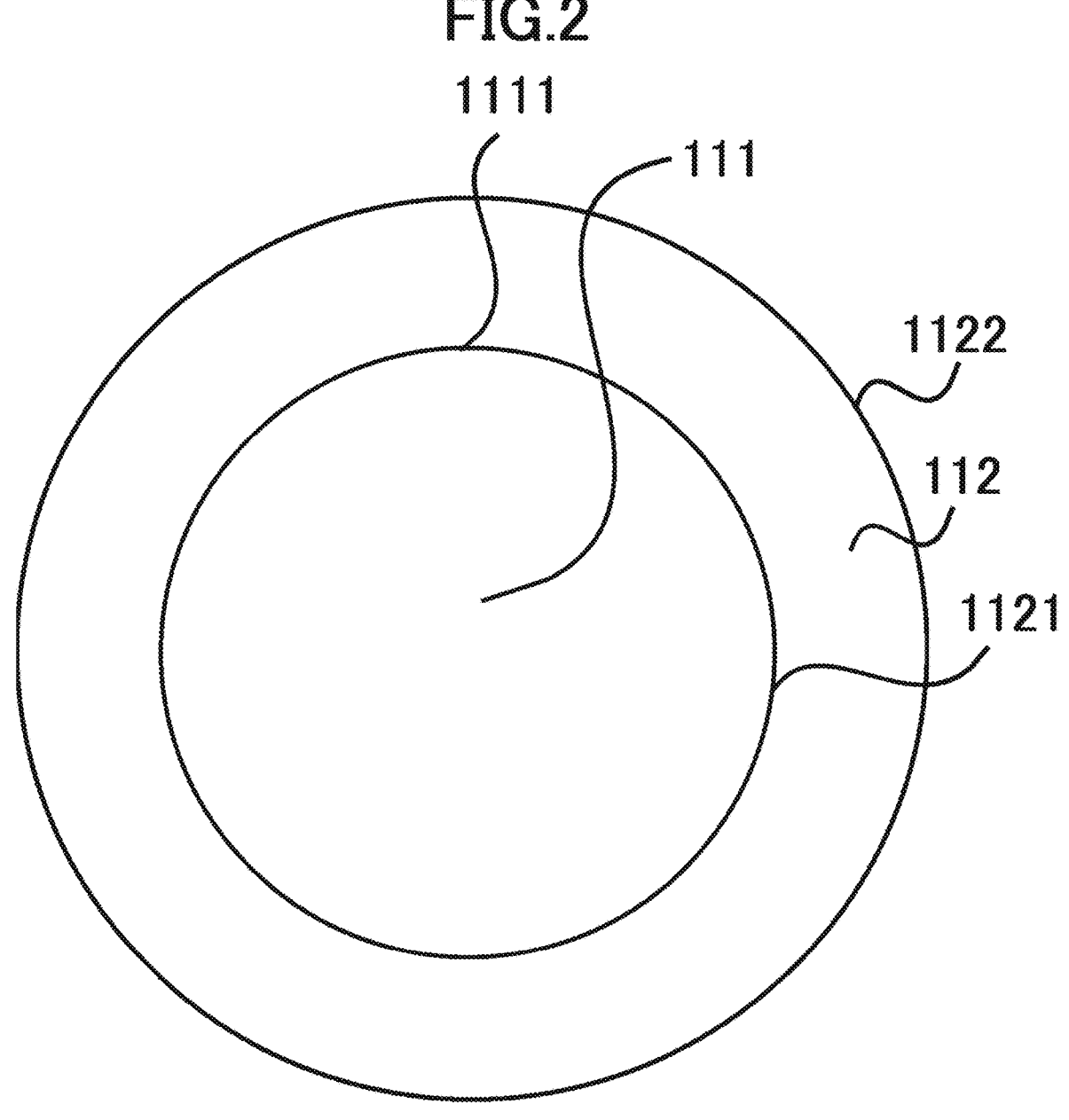
FIG. 2 is a top view of the reading apparatus of FIG. 1.
Figure 3:
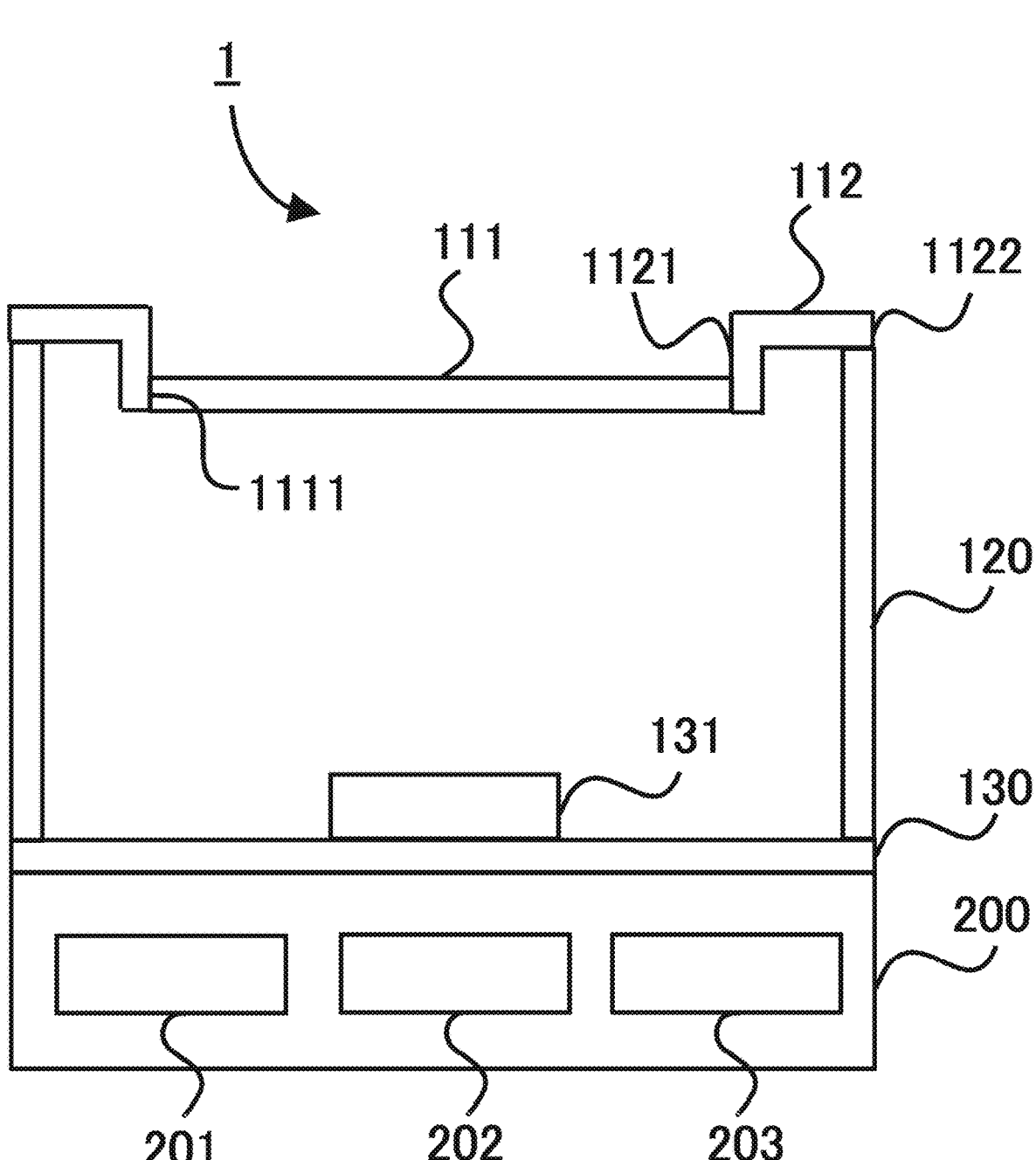
FIG. 3 is a sectional view taken along the line 3-3 of FIG. 1.

FIG. 1 is a perspective view of an example of a reading apparatus 1 for reading information from an RF tag 301 according to the first embodiment of the present disclosure. FIG. 2 is a top view of the reading apparatus 1 of FIG. 1. FIG. 3 is a sectional view taken along the line 3-3 of FIG. 1. For example, the reading apparatus 1 is used in a cash register operated by a store clerk in a store or a self-checkout machine operated by a customer in the store. The reading apparatus 1 includes a reading unit 100 and a controller 200. The reading unit 100 includes a top part 110, a side part 120, a bottom part 130, and an antenna 131.

The top part 110 includes a placement portion 111 and a prohibition portion 112. The placement portion 111 is made of a material that allows radio waves to pass through. The material that allows radio waves to pass through is, for example, wood but may also be other materials. The placement portion 111 has a shape corresponding to the polarization mode of the radio wave radiated by the antenna 131.

When the polarization mode of the radio wave radiated by the antenna 131 is, for example, circular polarization, the placement portion 111 is a circular flat plate. However, in this case, the shape of the placement portion 111 does not necessarily need to be a perfect circle and may be a circle close to a perfect circle according to the radio wave radiation characteristics of the antenna 131. The article 300 to which the passive RF tag 301 is attached is placed on the upper surface of the placement portion 111. The article 300 is, for example, a commodity. The article 300 may be put in a shopping basket 302, and the shopping basket 302 may be placed on the upper surface of the placement portion 111.

The RF tag 301 is used, for example, to collectively manage a plurality of articles in the entire supply chain including production, intermediate distribution, and sales. The RF tag 301 is used, for example, for inventory management (inspection and stocktaking) of commodities in a factory, inspection and stocktaking of commodities in intermediate distribution, a self-checkout machine in a store, and the like. The reading apparatus 1 communicates with the RF tag 301 by, for example, a radio wave in the UHF band of frequencies 860-960 MHz. The reading apparatus 1 reads information including tag ID (IDentification) from the RF tag 301 when the article 300 to which the RF tag 301 is attached is placed on the upper surface of the placement portion 111.

The prohibition portion 112 is made of a material that allows radio waves to pass through. The prohibition part 112 is, for example, annular. The prohibition portion 112 has an inner edge 1121 in contact with the outer edge 1111 of the placement portion 111 and surrounds the placement portion 111. There is a gap between an outer edge 1111 of the placement portion 111 and an outer edge 1122 of the prohibition portion 112. An article is prohibited from being placed on the prohibition portion 112. The RF tag 301 cannot be placed on the prohibition portion 112. As shown in FIG. 3, the cross-sectional shape of the prohibition portion 112 is formed in an L shape. The prohibition portion 112 is composed of a parallel portion that is parallel to the placement portion 111 and a vertical portion that is perpendicular to the placement portion 111. An upper end of the vertical portion is fixed to the inner edge of the parallel portion. The lower end of the vertical portion is fixed to, for example, the outer edge 1111 of the placement portion 111. Since the prohibition portion 112 has the vertical portion, the placement portion 111 is recessed relative to the prohibition portion 112, and the article 300 or the shopping basket 302 can be easily placed on the placement portion 111.

The placement portion 111 and the prohibition portion 112 may be located on the same plane. In this case, there is no vertical portion in the prohibition portion 112. In this configuration, it is desirable to provide a mark on the upper surface of the top part 110 so that the placement portion 111 and the prohibition portion 112 can be distinguished from each other.

The side part 120 is, for example, cylindrical. A lower end of the side part 120 is fixed to the outer edge of the bottom part 130. The side part 120 stands vertically from the outer edge of the bottom part 130. The upper end of the side part 120 is fixed to the outer edge of the parallel portion of the prohibition portion 112 (i.e., the outer edge 1122 of the prohibition portion 112). The side part 120 is made of a material that allows radio waves to pass through.

The bottom part 130 is, for example, a circular flat plate. The bottom part 130 may be made only of a material that allows radio waves to pass through or may include a radio wave absorbing layer that absorbs radio waves or a radio wave reflecting layer that reflects radio waves. An antenna 131 is located on the upper surface of the bottom part 130. The antenna 131 is an antenna for communicating with the RF tag 301. The antenna 131 radiates a radio wave upward to communicate with the RFID tag 301 and receives a response radio wave transmitted by the RF tag 301. The antenna 131 may be, for example, a planar antenna or a sheet antenna. The antenna 131 radiates a circularly polarized radio wave, or radiates two linearly polarized radio waves whose polarization directions are orthogonal to each other while switching the radio waves. The antenna 131 is below the placement portion 111. The radio wave radiated by the antenna 131 propagates while spreading upward. The antenna 131 is located at a position where a radio wave with high intensity is radiated toward the placement portion 111 and a radio wave with lower intensity than that of the radio wave radiated toward the placement portion 111 is radiated toward the prohibition portion 112. When the antenna 131 radiates a circularly polarized radio wave, it is desirable that the antenna 131 is located so that the center of an area where the radio wave is radiated is positioned directly below the center of the placement portion 111.

The controller 200 includes a transmission/reception part 201, an acquisition part 202, and an interface (I/F) 203. The transmission/reception part 201 causes the antenna 131 to radiate a circularly polarized radio wave, or to radiate two linearly polarized radio waves whose polarization directions are orthogonal to each other while switching the radio waves. When the antenna 131 receives a response radio wave, the transmission/reception part 201 obtains information including the tag ID from the response radio wave.

The RF tag 301 obtains the power needed to operate by receiving a radio wave transmitted by the antenna 131. When the intensity of the radio wave received by the RF tag 301 is lower than predetermined intensity, the RFID tag 301 does not operate and does not transmit the response radio wave.

Figure 4:
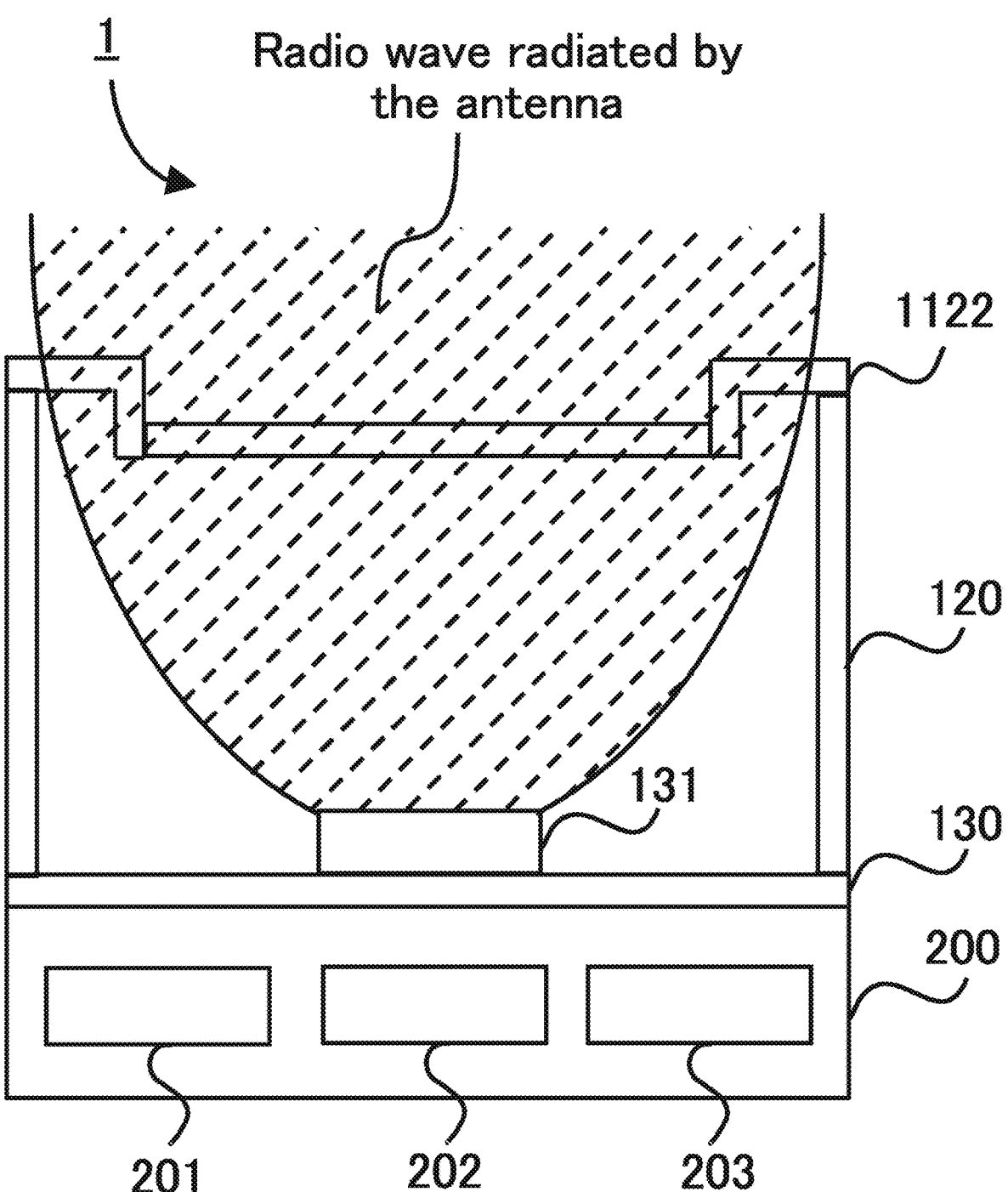
FIG. 4 shows an example of a radio wave radiated by the antenna in the reading apparatus according to the first embodiment.

FIG. 4 shows an example of a radio wave radiated by the antenna 131 in the reading apparatus 1 according to the first embodiment. In the example of FIG. 4, the RF tag 301 that receives the radio wave in the range indicated by the diagonally right-up dashed line operates and transmits the response radio wave. The radio wave radiated by the antenna 131 is attenuated to the intensity at which the RF tag 301 does not operate when it reaches the outer edge 1122 of the prohibition portion 112. The transmission/reception part 201 causes the antenna 131 to radiate a radio wave with the intensity at which the RF tag 301 does not operate when the radio wave reaches the outer edge 1122 of the prohibition portion 112. In the reading apparatus 1, there is a gap between the outer edge 1111 of the placement portion 111 and the outer edge 1122 of the prohibition portion 112. As a result, the intensity of the radio wave that is radiated by the antenna 131 and reaches the RF tag 301 on the placement portion 111 is larger than predetermined intensity, and the intensity of the radio wave that is radiated by the antenna 131 and reaches the RF tag 301 around the top part 110 is the intensity that does not allow the RF tag 301 to operate.

For example, when the longitudinal direction of the antenna of an RF tag 301 is nearly perpendicular to the main surface of the antenna 131 or when a plurality of RF tags 301 overlap each other, the radio wave received by the antenna of the RF tag 301 is weakened. However, the intensity of the radio wave radiated by the antenna 131 toward the placement portion 111 is high. Therefore, the RF tag 301 attached to the article 300 placed on the upper surface of the placement portion 111 can operate. The transmission/reception part 201 can obtain information from the RF tag 301 attached to the article 300 placed on the upper surface of the placement portion 111. There is a low possibility that the transmission/reception part 201 fails to read information from the RF tag 301 placed on the upper surface of the placement portion 111.

In contrast, the intensity of the radio wave radiated by the antenna 131 toward the prohibition portion 112 is low. Suppose the RF tag 301 is placed on the upper surface of the prohibition portion 112. In that case, the RF tag 301 may not operate in a case where the longitudinal direction of the antenna of the RF tag 301 is nearly perpendicular to the main surface of the antenna 131 or in a case where a plurality of RF tags 301 overlap each other. Therefore, there is a possibility that the transmission/reception part 201 may fail to read information from the RF tag 301. However, the RF tag 301 is not placed on the upper surface of the prohibition portion 112. Since the radio wave that is radiated by the antenna 131 and reaches an RF tag 301 around the top part 110 has the intensity that does not allow the RF tag 301 to operate, the transmission/reception part 201 can exclude the RF tag 301 around the top part 110 from a target from which information is read.

Also, a store usually has a ceiling. When the reading apparatus 1 is used in a store, a radio wave radiated by the antenna 131 may be reflected by the ceiling and reach the RF tag 301 around the top part 110 (That is, the RF tag 301 that is not placed on the top part 110). However, the radio wave is attenuated before reaching the ceiling, and the radio wave reflected by the ceiling is further attenuated before reaching the RF tag 301 around the top part 110. The transmission/reception part 201 causes the antenna 131 to radiate the radio wave with the intensity at which the RF tag 301 around the top part 110 does not operate due to the radio wave reflected by the ceiling.

If the RF tag 301 does not operate, it does not transmit the response radio wave. Therefore, the reading apparatus 1 does not obtain information from the RF tag 301 around the top part 110. As a result, there is a low possibility that the reading apparatus 1 fails to read information from an RF tag 301 placed on the upper surface of the placement portion 111. And the reading apparatus 1 can prevent accidentally reading information from an RF tag 301 around the top part 110.

The acquisition part 202 identifies each RF tag 301 and acquires information from each RF tag 301 included in the response radio wave received by the antenna 131. The I/F 203 transmits information of each RF tag 301 acquired by the acquisition part 202 to an external apparatus (for example, an accounting device or the like), and receives an instruction of an operation to the reading apparatus 1 from the external apparatus.

The distance between the outer edge 1111 of the placement portion 111 and the outer edge 1122 of the prohibiting portion 112 can be constant, if the placement portion 111 is a circular flat plate, the prohibition portion 112 is annular, the antenna 131 radiates a circularly polarized radio wave and the center of the area of the antenna 131 that radiates a radio wave is located directly below the center of the placement portion 111.

In addition, in the above-described first embodiment, an example in which the placement portion 111 is a circular flat plate has been described. But the present disclosure is not limited thereto. The placement portion 111 may be other shapes such as a rectangular flat plate.

The controller 200 can also be realized by a commercially available RFID reader/writer.

Figure 5:
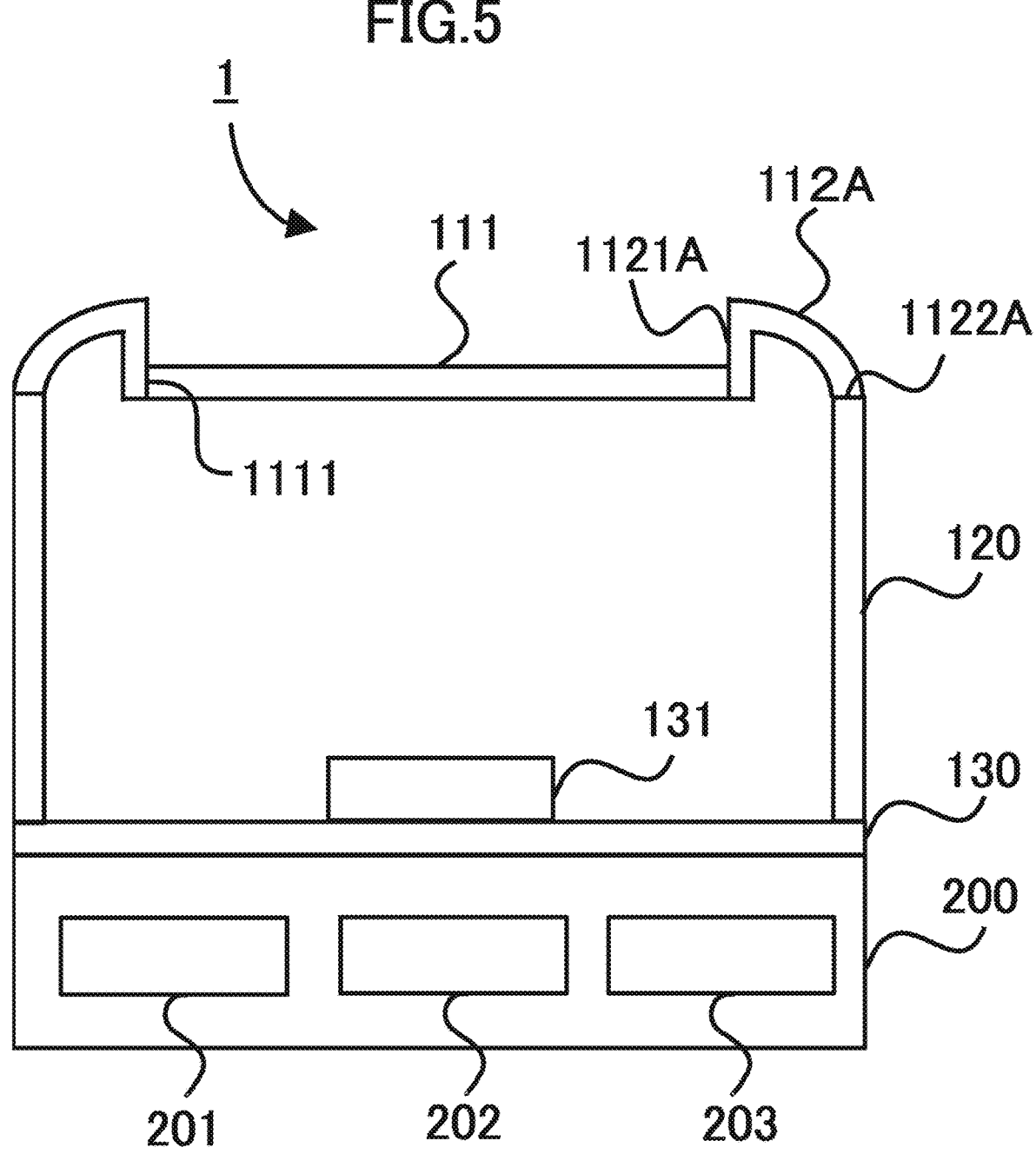
FIG. 5 shows a prohibition portion that is the first modification of the prohibition portion in the reading apparatus shown in FIG. 1.

FIG. 5 shows a prohibition portion 112A that is the first modification of the prohibition portion 112 in the reading apparatus 1 shown in FIG. 1. The cross-sectional shape of the prohibition portion 112A is composed of a fan-shaped arc portion having a central angle of 90° or less and a vertical portion extending vertically downward from one end of the arc portion. The lower end of the vertical portion is fixed to the outer edge 1111 of the placement portion 111. In the vertical portion, the side surface fixed to the outer edge 1111 is the inner edge 1121A of the prohibition portion 112A. The other end of the arc portion is fixed to the upper end of the side part 120. The other end of the arc portion is the outer edge 1122A of the prohibition portion 112A. The placement portion 111 is recessed relative to the prohibition portion 112A. An article 300 cannot be placed easily on the prohibition portion 112A that is composed of the fan-shaped arc portion and the vertical portion.

Figure 6:
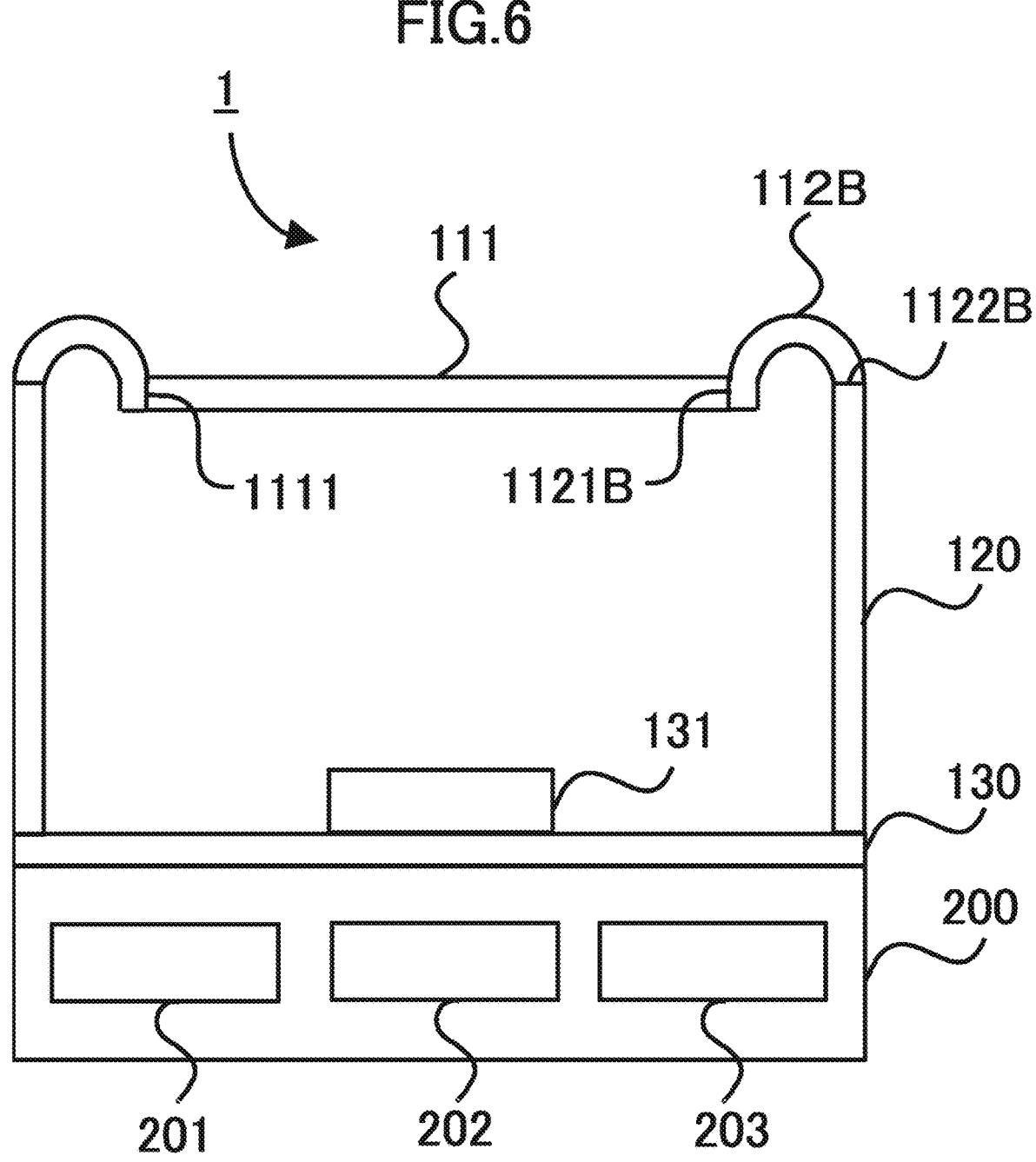
FIG. 6 shows a prohibition portion that is the second modification of the prohibition portion in the reading apparatus shown in FIG. 1.

FIG. 6 shows a prohibition portion 112B that is the second modification of the prohibition portion 112 in the reading apparatus 1 shown in FIG. 1. The cross-sectional shape of the prohibition portion 112B is a fan-shaped arc portion having a central angle of 180° or less. One end of the arc portion is fixed to the outer edge 1111 of the placement portion 111. One end of the arc portion is the inner edge 1121B of the prohibition portion 112B. The other end of the arc portion is fixed to the upper end of the side part 120. The other end of the arc portion is the outer edge 1122B of the prohibition portion 112B. The placement portion 111 is recessed relative to the prohibition portion 112B. An article 300 cannot be placed easily on the prohibition portion 112B that is composed of the fan-shaped arc portion having a central angle of 180° or less.

Figure 7:
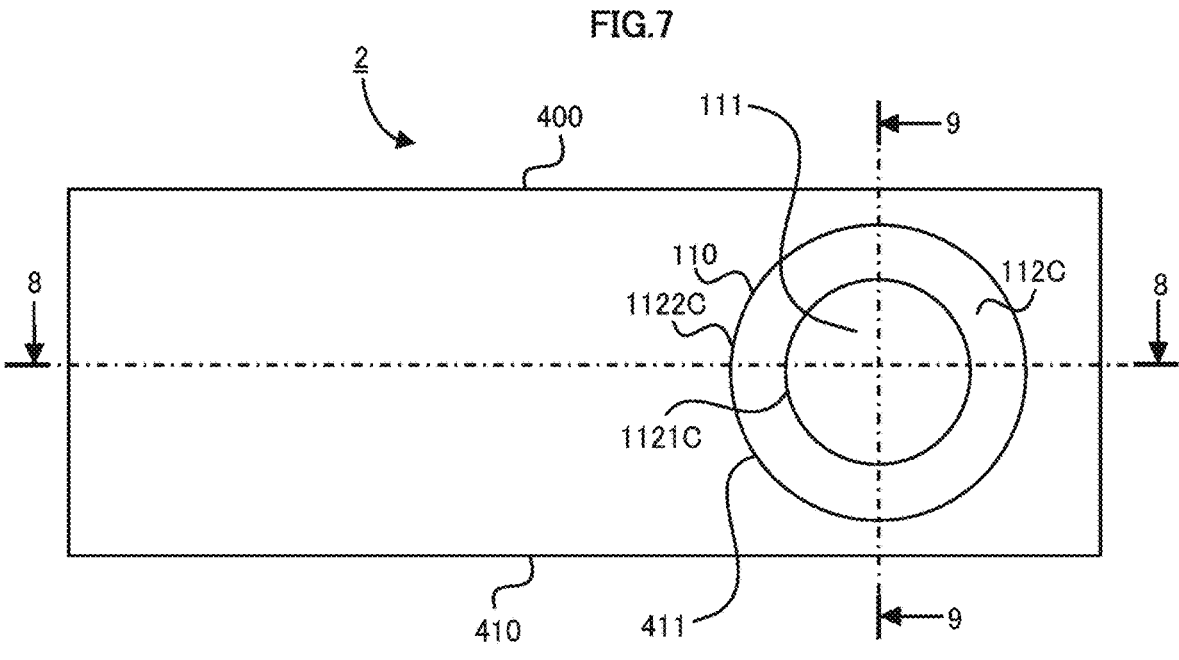
FIG. 7 is a top view of a reading apparatus that is a modification of the reading apparatus according to the first embodiment of the present disclosure.
Figure 8:
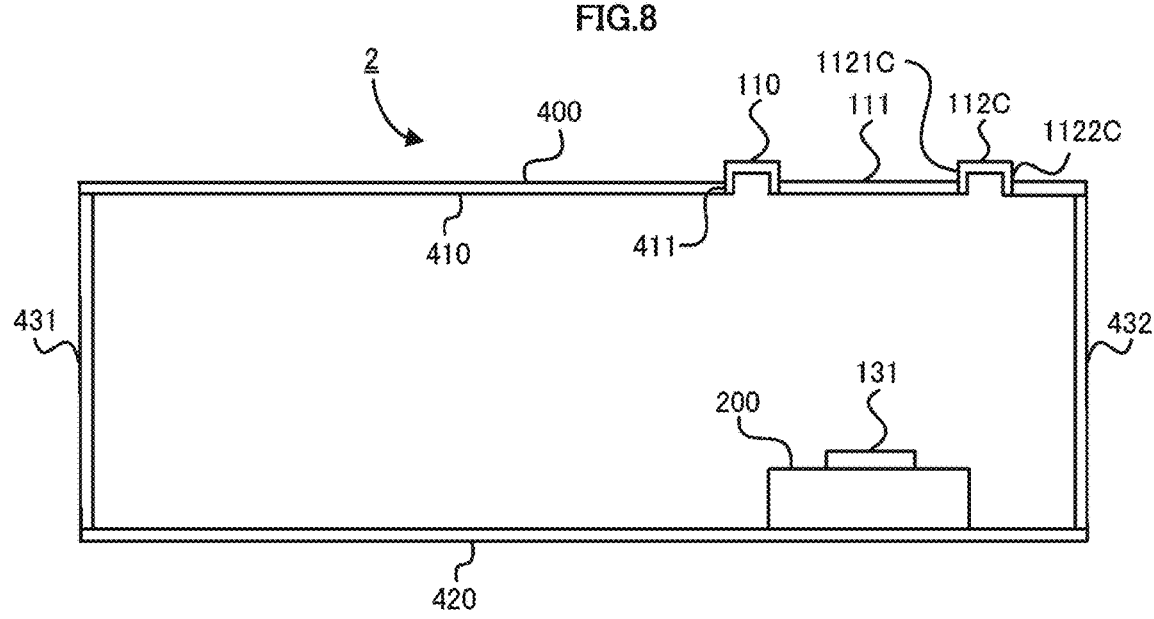
FIG. 8 is a sectional view taken along the line 8-8 of FIG. 7.
Figure 9:
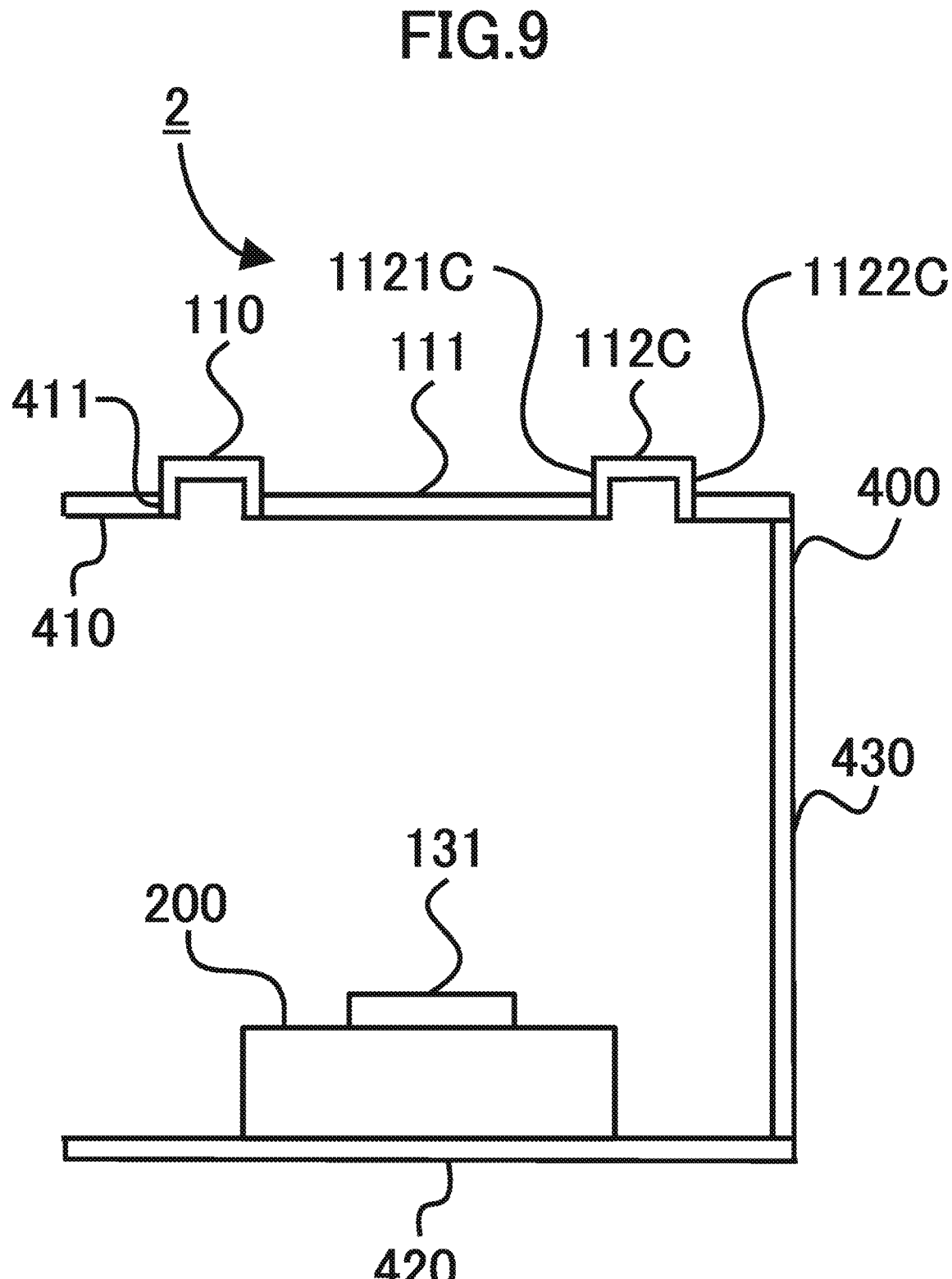
FIG. 9 is a sectional view taken along the line 9-9 of FIG. 7.

FIG. 7 is a top view of a reading apparatus 2 that is a modification of the reading apparatus 1 according to the first embodiment of the present disclosure. FIG. 8 is a sectional view taken along the line 8-8 of FIG. 7. FIG. 9 is a sectional view taken along the line 9-9 of FIG. 7. The reading apparatus 2 includes a stand 400. In addition, it includes the top part 110, the controller 200, and the antenna 131 of the reading apparatus 1 according to the first embodiment.

The stand 400 has a top portion 410, a bottom portion 420, a front portion 430, a left side portion 431, and a right side portion 432. Each of the top portion 410, the bottom portion 420, the front portion 430, the left side portion 431, and the right side portion 432 is, for example, a rectangular flat plate. The back of the stand 400 is open. A hole 411 is formed in the top portion 410 of the stand 400. The top part 110 of the reading apparatus 1 according to the first embodiment is attached to the hole 411. For example, an accounting device or the like can be placed in an area excluding the top part 110 on the top portion 410 of the stand 400. Customers can also bag their purchases in this area.

It should be noted that the prohibition portion 112C included in the top portion 110 is a modification of the prohibition portion 112. While the prohibition portion 112 is composed of the parallel portion and the vertical portion, the prohibition portion 112C has the second vertical portion fixed to the outer edge of the parallel portion in addition to the first vertical portion fixed to the inner edge of the parallel portion. The first vertical portion of the prohibition portion 112C is an inner edge 1121C of the prohibition portion 112C, and the second vertical portion is an outer edge 1122C of the prohibition portion 112C. Accordingly, the cross-sectional shape of the prohibition portion 112C is convex. The prohibition portion 112C protrudes upward from the top portion 410 of the stand 400. The placement portion 111 is recessed relative to the parallel portion of the prohibition portion 112C.

The controller 200 is placed, for example, on the upper surface of the bottom portion 420. The antenna 131 is placed, for example, on the controller 200 at a position where a radio wave with high intensity is radiated toward the placement portion 111 and a radio wave with lower intensity than that of the radio wave radiated toward the placement portion 111 is radiated toward the prohibition portion 112C. When the antenna 131 radiates a circularly polarized radio wave, it is desirable that the antenna 131 is located so that the center of an area where the radio wave is radiated is positioned directly below the center of the placement portion 111. The antenna 131 may be placed on the upper surface of the bottom portion 420 instead of being placed on the controller 200.

Figure 10:
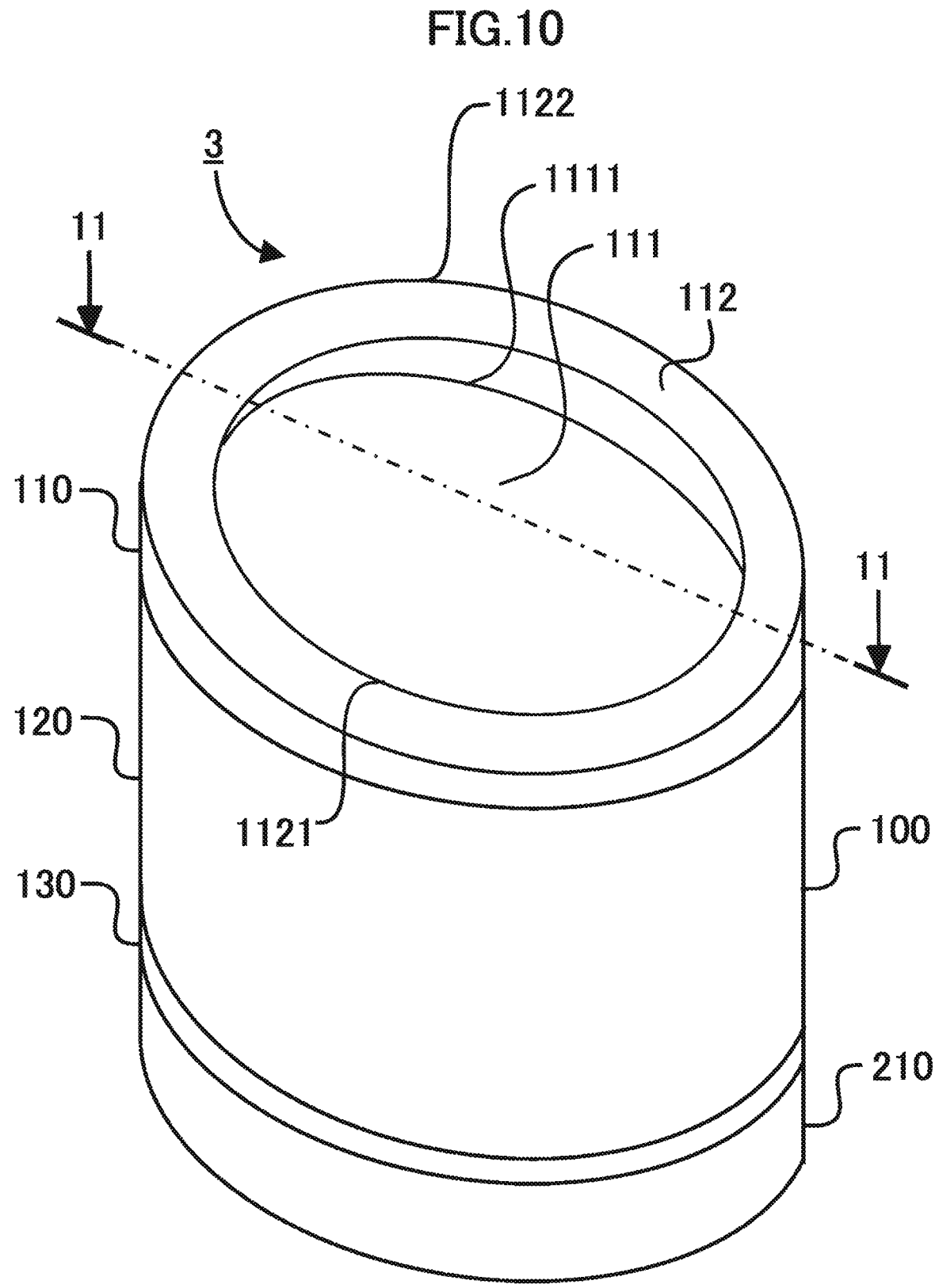
FIG. 10 is a perspective view of an example of a reading apparatus for reading information from an RF tag according to the second embodiment of the present disclosure.
Figure 11:
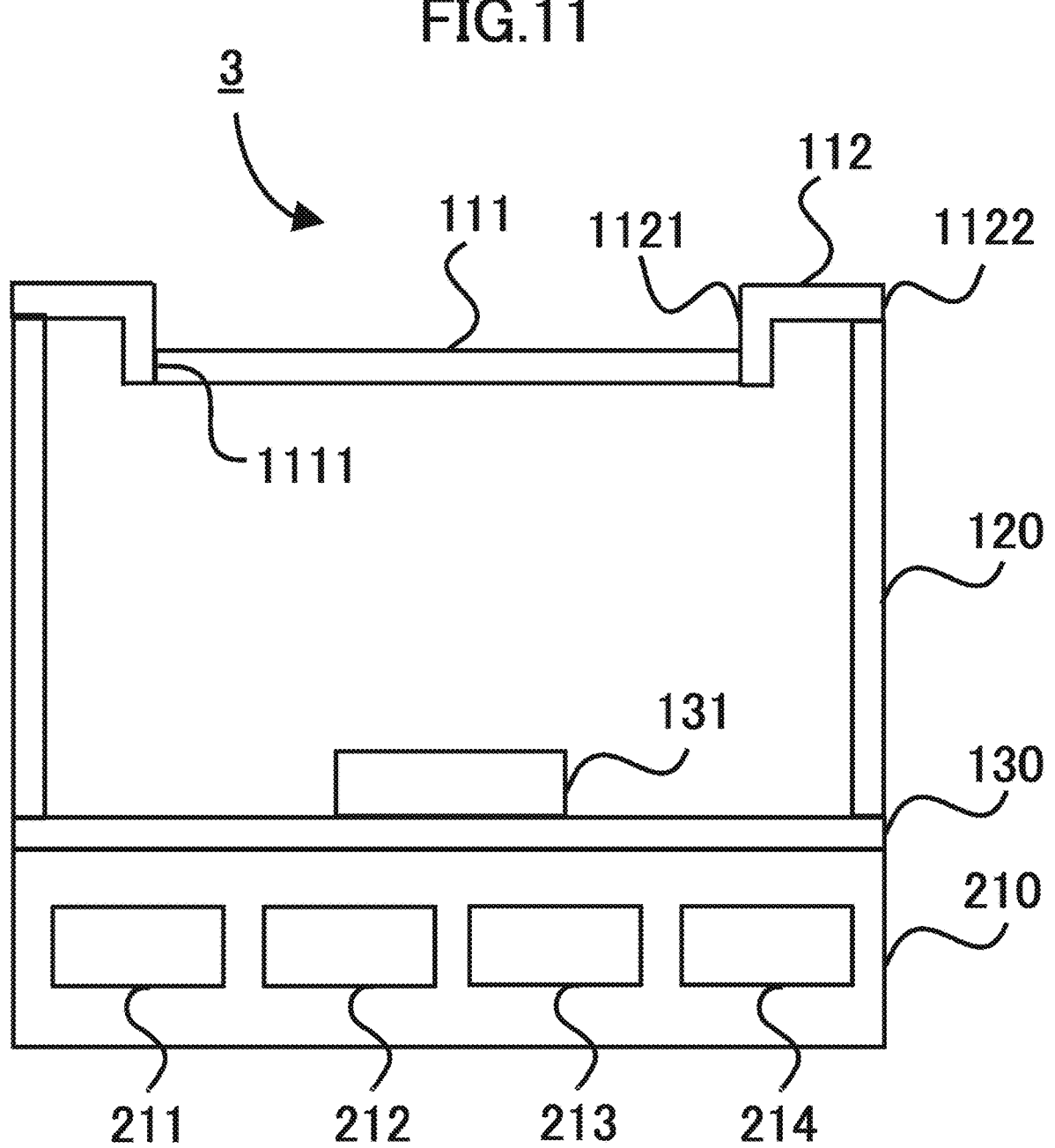
FIG. 11 is a sectional view taken along the line 11-11 of FIG. 10.

FIG. 10 is a perspective view of an example of a reading apparatus 3 for reading information from an RF tag 301 according to the second embodiment. FIG. 11 is a sectional view taken along the line 11-11 of FIG. 10. The reading apparatus 3 includes a reading unit 100 and a controller 210. The configuration of the reading unit 100 according to the second embodiment is the same as that of the reading unit 100 in the reading apparatus 1 according to the first embodiment.

Figure 12:
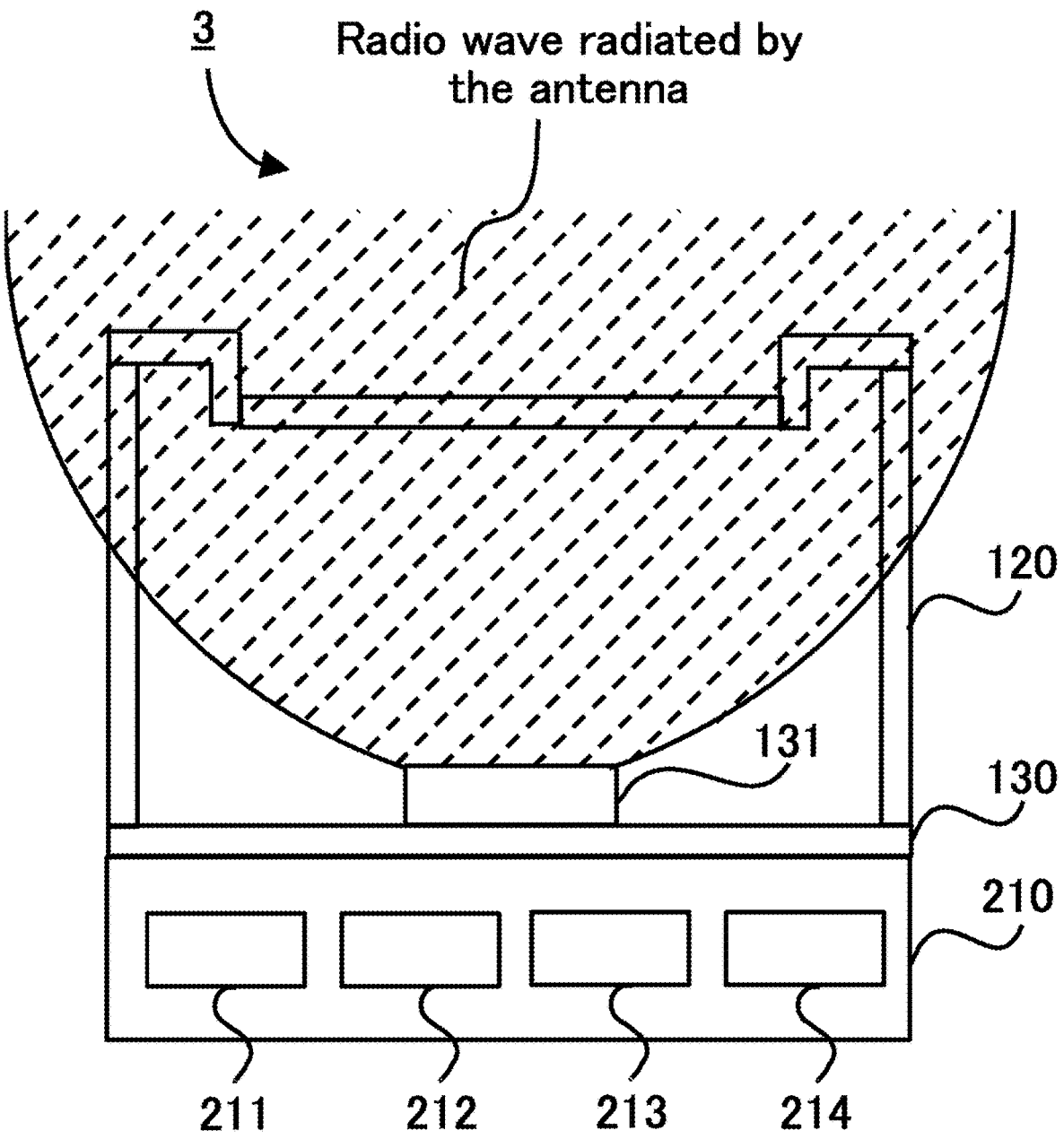
FIG. 12 shows an example of a radio wave radiated by the antenna in the reading apparatus according to the second embodiment.

The radio wave output of the antenna 131 in the reading apparatus 3 according to the second embodiment is larger than that of the reading apparatus 1 according to the first embodiment. FIG. 12 shows an example of a radio wave radiated by the antenna 131 in the reading apparatus 3 according to the second embodiment. In the example of FIG. 12, the RF tag 301 that receives the radio wave in the range indicated by the diagonally right-up dashed line operates and transmits the response radio wave. This range extends outside the outer edge 1122 of the prohibition portion 112. Therefore, the RF tag 301 around the top part 110 may operate to transmit a response radio wave. However, there is a gap between the outer edge 1111 of the placement portion 111 and the outer edge 1122 of the prohibition portion 112. As a result, there is a difference between the intensity of the radio wave that is radiated by the antenna 131 and reaches the RF tag 301 on the placement portion 111 and the intensity of the radio wave that is radiated by the antenna 131 and reaches the RF tag 301 around the top part 110. Accordingly, as described below, the reading apparatus 3 can determine whether the RF tag 301 is on the placement portion 111 or the RF tag 301 is around the top part 110.

The controller 210 includes a transmission/reception part 211, a determination part 212, an acquisition part 213, and an I/F (interface) 214. The transmission/reception part 211 causes the antenna 131 to radiate a radio wave with high intensity toward the placement portion 111 and radiate a radio wave with low intensity toward the prohibition portion 112.

If an RF tag 301 is capable of transmitting an RSSI (Received Signal Strength Indicator), the transmission/reception part 211 obtains the RSSI and information including a tag ID from a response radio wave when the antenna 131 receives the response radio wave from the RF tag 301. In this case, the RSSI indicates the intensity of the radio wave that has been radiated by the antenna 131 and has been received by the RF tag 301.

The determination part 212 determines whether the RF tag 301 is on the placement portion 111 (that is, on the top part 110) or around the top part 110 based on the RSSI obtained from the response radio wave. For example, when the RSSI obtained from the response radio wave received by the antenna 131 is equal to or higher than a predetermined first threshold, the determination part 212 determines that the RF tag 301 is on the placement portion 111. In contrast, for example, when the RSSI obtained from the response radio wave received by the antenna 131 is equal to or less than a predetermined second threshold, the determination part 212 determines that the RF tag 301 is around the top part 110.

Alternatively, when the antenna 131 receives the response radio wave of an RF tag 301, the transmission/reception part 211 obtains the intensity of the response radio wave and information including the tag ID from the response radio wave. The determination part 212 determines whether the RF tag 301 is around the top part 110 or on the placement portion 111 (that is, on the top part 110) based on the intensity of the response radio wave that has been transmitted by the RF tag 301 and has been received by the antenna 131. For example, when the intensity of the response radio wave obtained from the response radio wave received by the antenna 131 is equal to or higher than a predetermined third threshold, the determination part 212 determines that the RF tag 301 is on the placement portion 111. In contrast, for example, when the intensity of the response radio wave obtained from the response radio wave received by the antenna 131 is equal to or less than a predetermined fourth threshold, the determination part 212 determines that the RF tag 301 is around the top part 110.

In the example of FIG. 12, there is a possibility that the RF tag 301 around the top part 110 operates. Though, the intensity of the radio wave that is radiated by the antenna 131 and leaks around the top part 110 is low. In addition, the RF tag 301 is not placed on the upper surface of the prohibition portion 112. There is a large difference between the intensity of the radio wave leaking around the top part 110 and the intensity of the radio wave on the placement portion 111. The intensity of the radio wave on the placement portion 111 is much larger than the intensity of the radio wave leaking around the top part 110. There is a low possibility that the transmission/reception part 211 fails to read information from the RF tag 301 placed on the upper surface of the placement portion 111.

In contrast, when the antenna 131 receives the response radio wave of the RF tag 301 that has operated by receiving the radio wave leaking around the top part 110, the RSSI or the intensity of the response radio wave obtained from the response radio wave is much lower than the RSSI or the intensity of the response radio wave obtained from the response radio wave transmitted from the RF tag 301 on the placement portion 111. The determination part 212 can determine whether the RF tag 301 is around the top part 110 or on the placement portion 111 based on the RSSI or the intensity of the response radio wave that has been transmitted by the RF tag 301 and has been received by the antenna 131.

Also, a store usually has a ceiling. When the reading apparatus 3 is used in a store, a radio wave radiated by the antenna 131 may be reflected by the ceiling and reach the RF tag 301 around the top part 110. However, the radio wave is attenuated before reaching the ceiling, and the radio wave reflected by the ceiling is further attenuated before reaching the RF tag 301 around the top part 110. When the RF tag 301 around the top part 110 is operated by the reflected radio wave and the RF tag 301 transmits a response radio wave, the response radio wave may also be reflected by the ceiling and reach the antenna 131. In this case, the determination part 212 can determine that the RF tag 301 is around the top part 110 based on the RSSI or the intensity of the response radio wave that is transmitted by the RF tag 301 and is received by the antenna 131. In the reading apparatus 3, even if the RF tag 301 around the top part 110 is operated by the radio wave that is reflected by the ceiling, transmission/reception part 211 causes the antenna 131 to radiate a radio wave with the intensity at which the determination part 215 can determine that the RFID tag 301 is around the top part 110 based on the RSSI or the intensity of the response radio wave obtained from the response radio wave transmitted by the RF tag 301.

Therefore, the reading apparatus 3 can acquire information from the RF tag 301 attached to the article 300 placed on the upper surface of the placement portion 111 except for the RF tag 301 around the top part 110, since there is a gap between the outer edge 1111 of the placement portion 111 and the outer edge 1122 of the prohibition portion 112. There is a low possibility that the reading apparatus 3 fails to read information from the RF tag 301 placed on the upper surface of the placement portion 111. And the reading apparatus 3 can prevent accidentally reading information from the RF tag 301 around the top part 110.

For example, when the determination part 212 determines that the RF tag 301 is on the placement portion 111, the acquisition part 213 identifies each RF tag 301 and acquires information read from each RF tag 301. Therefore, when the antenna 131 receives the response radio wave from the RF tag 301, the reading apparatus 3 can distinguish between the RF tag 301 on the placement portion 111 and the RF tag 301 around the top part 110, and can acquire information from the RF tag 301 on the placement portion 111.

The I/F 214 transmits information of each RF tag 301 acquired by the acquisition part 213 to an external apparatus (for example, an accounting device or the like), and receives an instruction of an operation to the reading apparatus 3 from the external apparatus.

The acquisition part 213 may also acquire information from the RF tag 301 around the top part 110, and the I/F 214 may transmit information of the RF tag 301 to the external apparatus along with information indicating that the RF tag 301 is around the top part 110.

The controller 210 can also be realized by a commercially available RFID reader/writer.

Similarly to the reading apparatus 2 shown in FIGS. 7 to 9, as a modification of the reading apparatus 3 according to the second embodiment, a reading apparatus including the stand 400, the top part 110, the controller 210 of the reading apparatus 2 according to the second embodiment, and the antenna 131 can be configured. However, in this configuration, the top portion 410 of the stand 400 is made only of a material that allows radio waves to pass through and does not include a radio wave absorbing layer or a radio wave reflecting layer.

Figure 13:
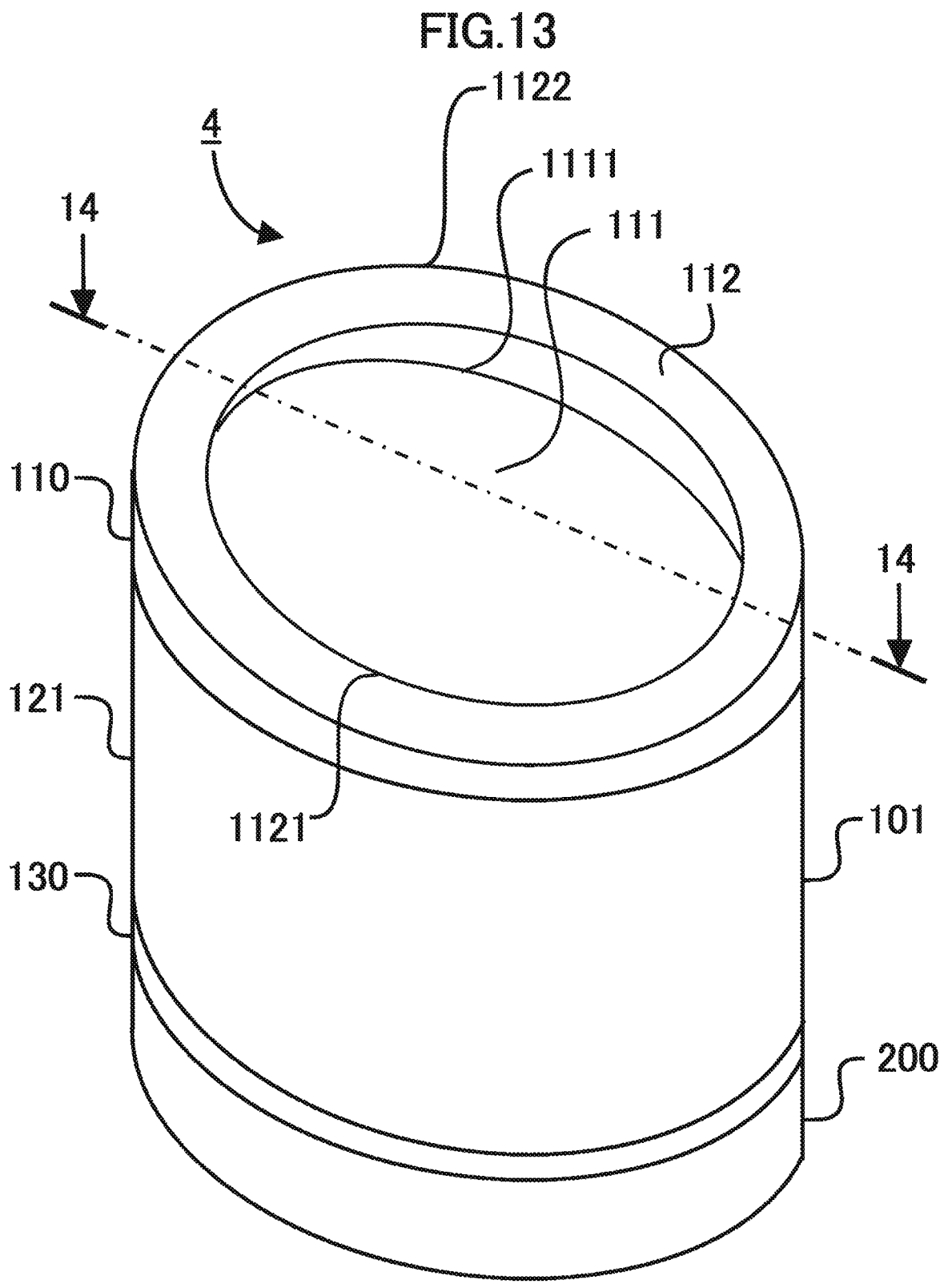
FIG. 13 is a perspective view of an example of a reading apparatus for reading information from an RF tag according to the third embodiment of the present disclosure.
Figure 14:
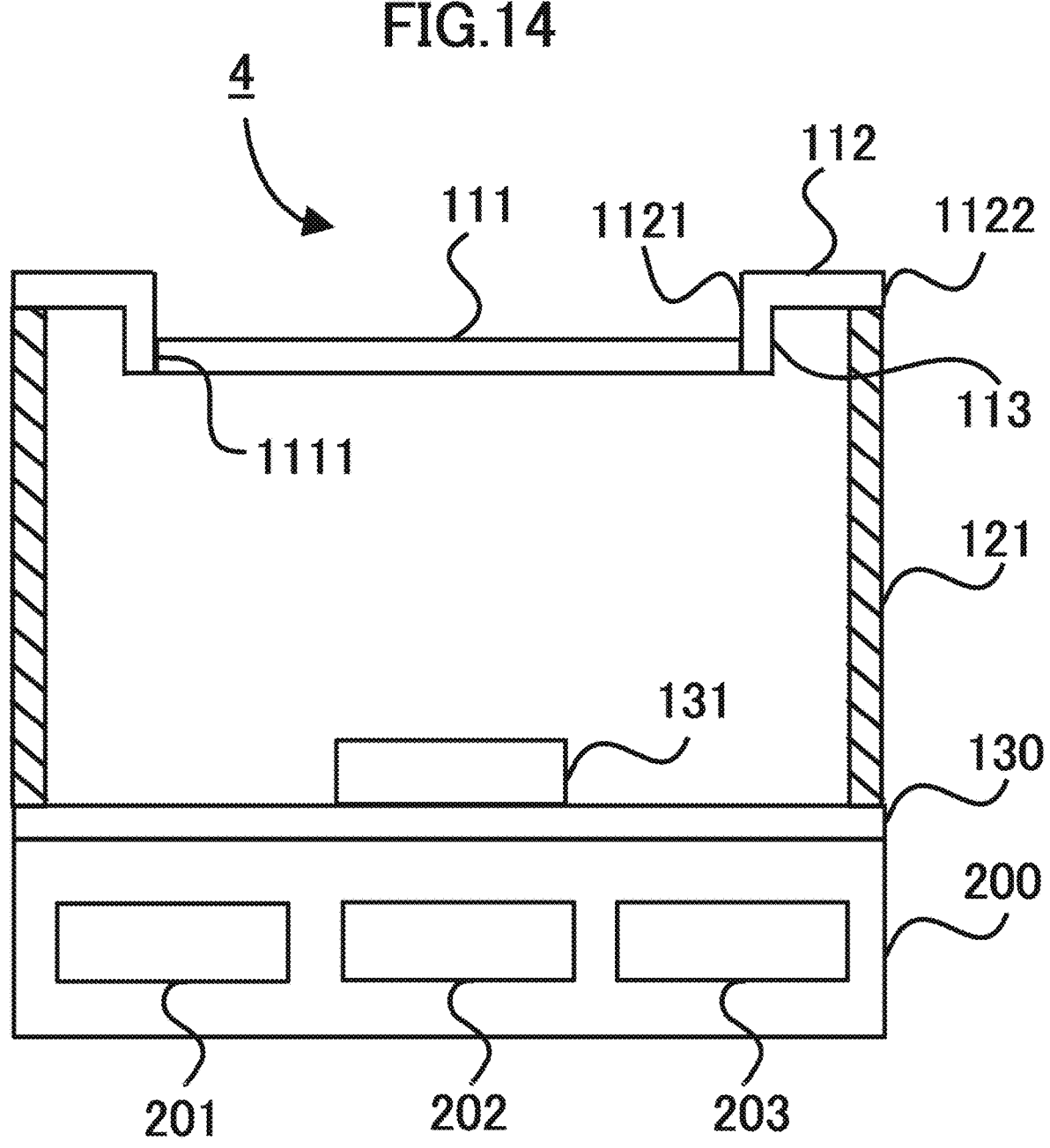
FIG. 14 is a sectional view taken along the line 14-14 of FIG. 13.
Figure 15:
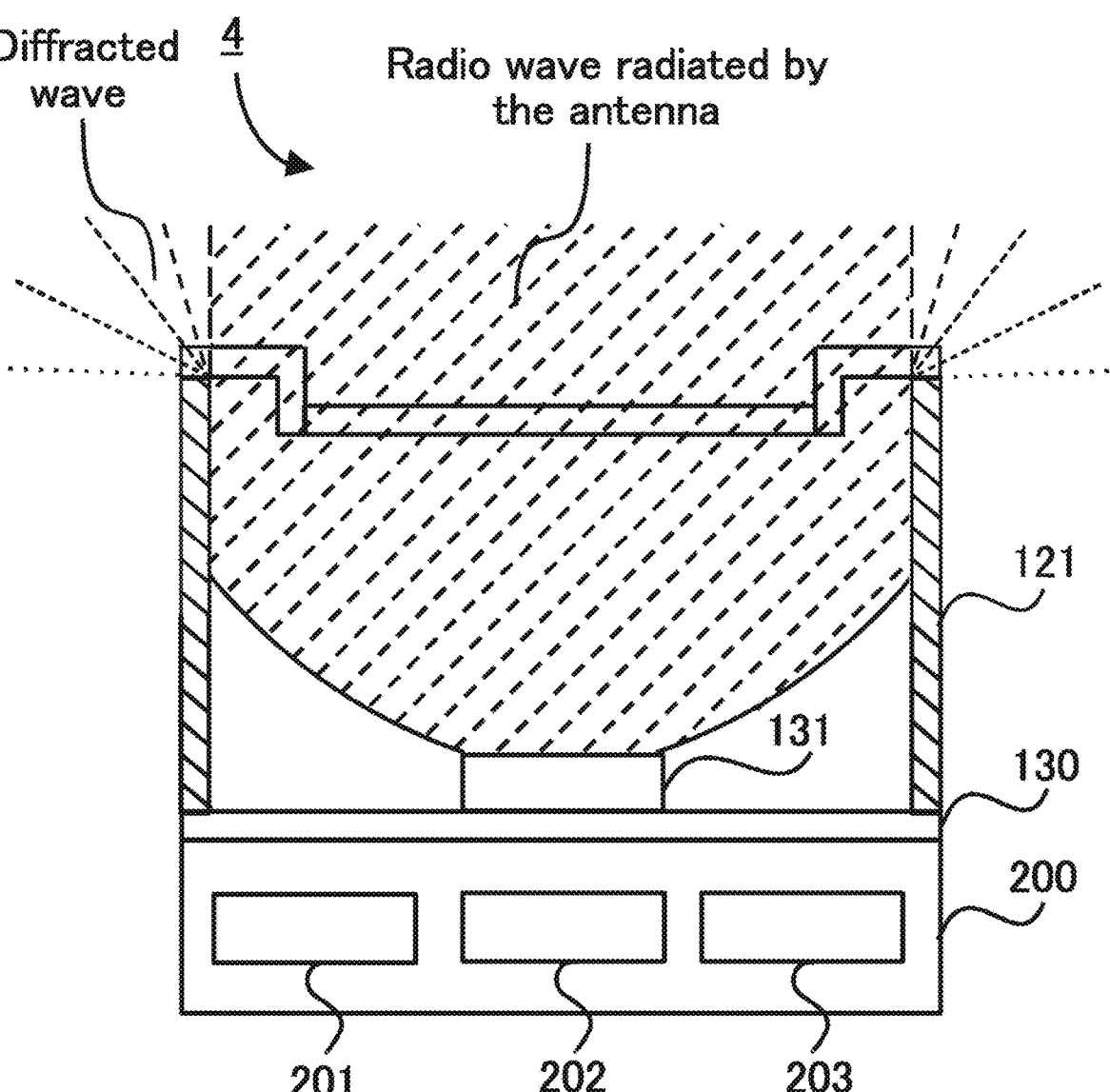
FIG. 15 shows an example of a radio wave radiated by the antenna in the reading apparatus according to the third embodiment.

In the reading apparatus 1 according to the first embodiment and the reading apparatus 3 according to the second embodiment described above, the side part 120 is made only of a material that allows radio waves to pass through. However, all or part of the inner surface of the side part may be covered with the radio wave absorbing layer. FIGS. 13 to 15 show an example of a reading apparatus 4 in which the side part 121 includes a radio wave absorbing layer that absorbs radio waves. The reading apparatus 4 is a modification of the reading apparatus 1 according to the first embodiment.

FIG. 13 is a perspective view of an example of a reading apparatus 4 for reading information from an RF tag 301 according to the third embodiment of the present disclosure.

FIG. 14 is a sectional view taken along the line 14-14 of FIG. 13. The reading apparatus 4 includes a reading unit 101 and a controller 200. The reading unit 101 includes a top part 110, a side part 121, a bottom part 130, and an antenna 131. The side part 121 differs from the side part 120 of the reading apparatus 1 according to the first embodiment in that it includes a radio wave absorbing layer that absorbs radio waves. In other respects, the configuration of the reading unit 101 is the same as that of the reading unit 100. The side part 121 is, for example, cylindrical. The side part 121 may be made of, for example, a plate material that absorbs radio waves. The side part 121 may have a configuration in which a radio wave absorbing sheet is attached to an inner surface of a plate material that allows radio waves to pass through. Also, the side part 121 may have a configuration in which a radio wave reflecting sheet is attached to an inner surface of a plate material that allows radio waves to pass through, and a radio wave absorbing sheet is attached to an inner surface of the radio wave reflecting sheet. The radio wave absorbing sheet is, for example, a sheet made of a material in which magnetic metal powder is mixed in a rubber material. The configuration of the controller 200 is the same as that of the controller 200 in the reading apparatus 1 according to the first embodiment.

FIG. 15 shows an example of a radio wave radiated by the antenna 131 in the reading apparatus 4 according to the third embodiment. As shown in FIG. 15, when the radio wave radiated by the antenna 131 reaches the outer edge 1122 of the prohibition portion 112, a diffracted wave is generated. In the example of FIG. 15, the RF tag 301 that receives the radio wave in the range indicated by the diagonally right-up dashed line operates and transmits the response radio wave.

The radio wave radiated by the antenna 131 is attenuated when it reaches the outer edge 1122 of the prohibition portion 112. The intensity of the diffracted wave is further lower than the intensity of the radio wave that has reached the outer edge 1122 of the prohibition portion 112. There is a large difference between the intensity of the diffracted wave and the intensity of the radio wave on the placement portion 111. The intensity of the radio wave on the placement portion 111 is much larger than the intensity of the diffracted wave. There is a low possibility that the transmission/reception part 211 fails to read information from the RF tag 301 placed on the upper surface of the placement portion 111. In contrast, in the reading apparatus 4, the RF tag 301 around the top part 110 does not operate, since the intensity of the diffracted wave is low. In the reading apparatus 4, there is a gap between the outer edge 1111 of the placement portion 111 and the outer edge 1122 of the prohibition portion 112. As a result, the intensity of the radio wave that is radiated by the antenna 131 and reaches the RF tag 301 on the placement portion 111 is larger than predetermined intensity, and the intensity of the radio wave that is radiated by the antenna 131 and reaches the RF tag 301 around the top part 110 is the intensity that does not allow the RF tag 301 to operate. If the RF tag 301 is placed on the upper surface of the prohibition portion 112, the RF tag 301 may operate and transmit the response radio wave when it receives the radio wave radiated by the antenna 131. But the RF tag 301 is not placed on the upper surface of the prohibition portion 112. In the reading apparatus 4, the RF tag 301 attached to the article 300 placed on the upper surface of the placement portion 111 operates, and the transmission/reception part 201 can obtain information from the RF tag 301. In contrast, since the radio wave that is radiated by the antenna 131 and reaches an RF tag 301 around the top part 110 has the intensity that does not allow the RF tag 301 to operate, the transmission/reception part 201 can exclude the RF tag 301 around the top part 110 from a target from which information is read.

Also, a store usually has a ceiling. When the reading apparatus 4 is used in a store, a radio wave radiated by the antenna 131 may be reflected by the ceiling and reach the RF tag 301 around the top part 110 (That is, the RF tag 301 that is not placed on the top part 110). However, the radio wave is attenuated before reaching the ceiling, and the radio wave reflected by the ceiling is further attenuated before reaching the RF tag 301 around the top part 110. The transmission/reception part 201 causes the antenna 131 to radiate the radio wave with the intensity at which the RF tag 301 around the top part 110 does not operate due to the radio wave reflected by the ceiling.

If the RF tag 301 does not operate, it does not transmit the response radio wave. Therefore, the reading apparatus 4 does not obtain information from the RF tag 301 around the top part 110. As a result, there is a low possibility that the reading apparatus 4 fails to read information from an RF tag 301 placed on the upper surface of the placement portion 111. And the reading apparatus 4 can prevent accidentally reading information from an RF tag 301 around the top part 110.

Figure 16:
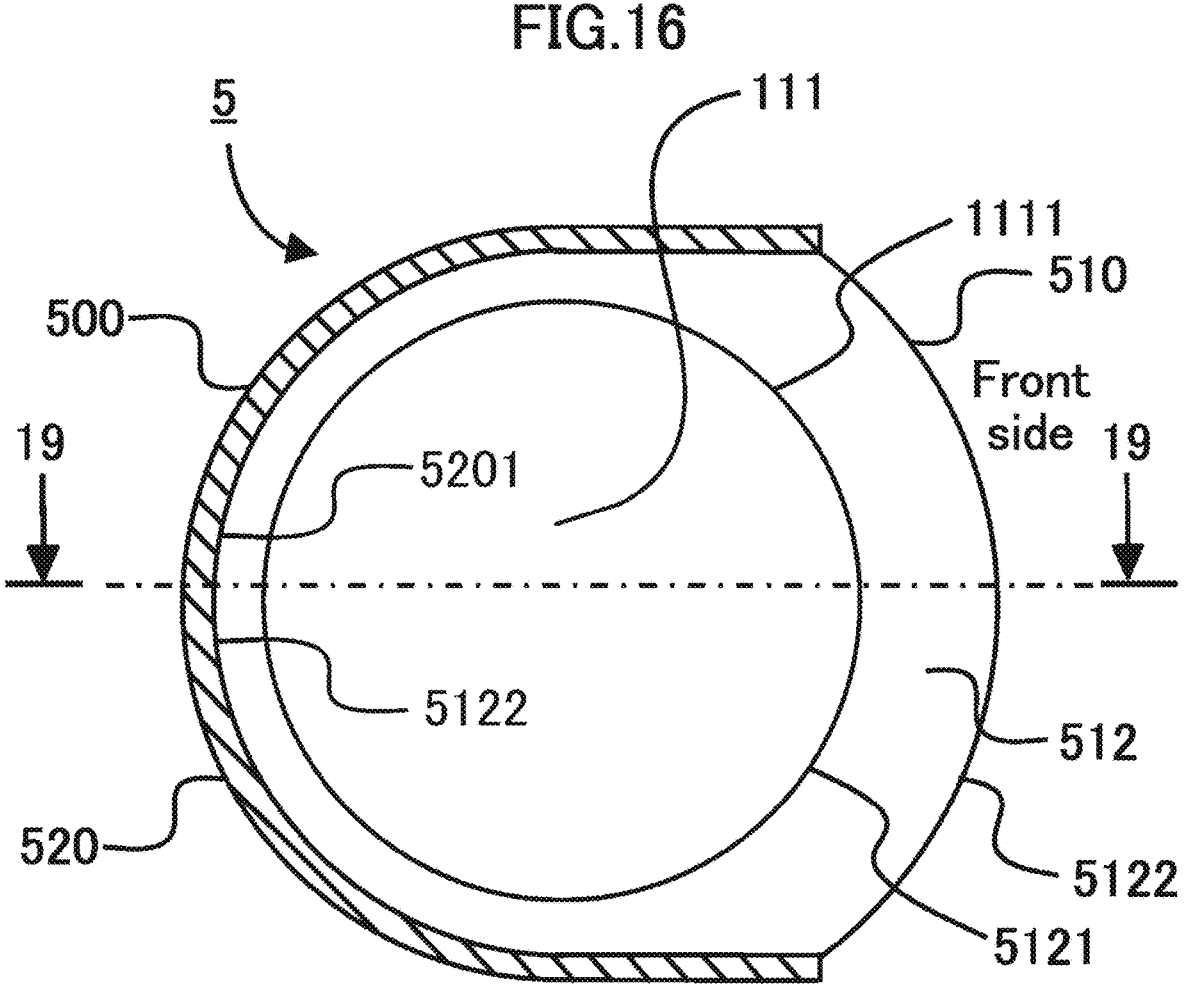
FIG. 16 is a top view of an example of the reading apparatus according to the fourth embodiment of the present disclosure.
Figure 17:
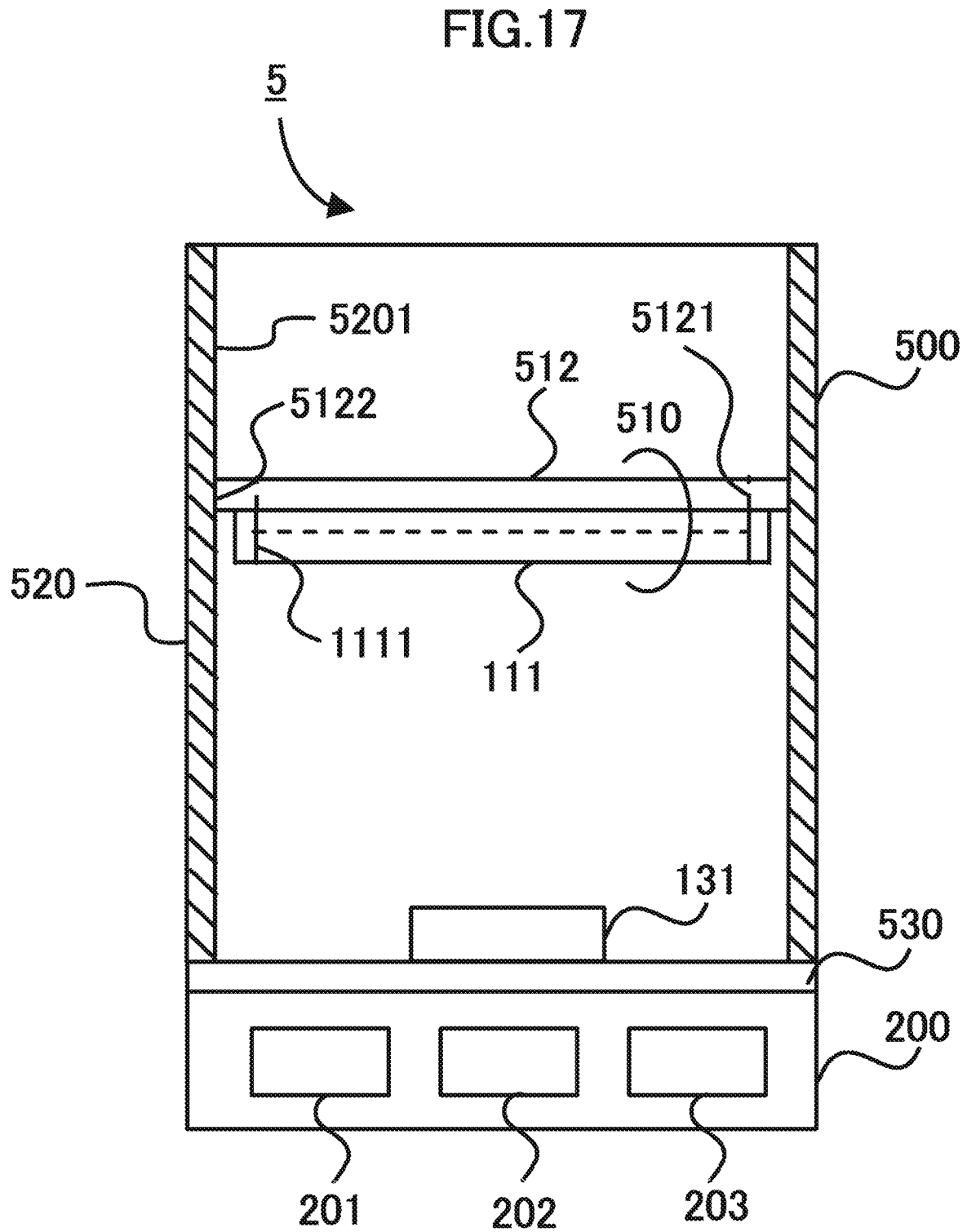
FIG. 17 is a front view of the reading apparatus shown in FIG. 16.
Figure 18:
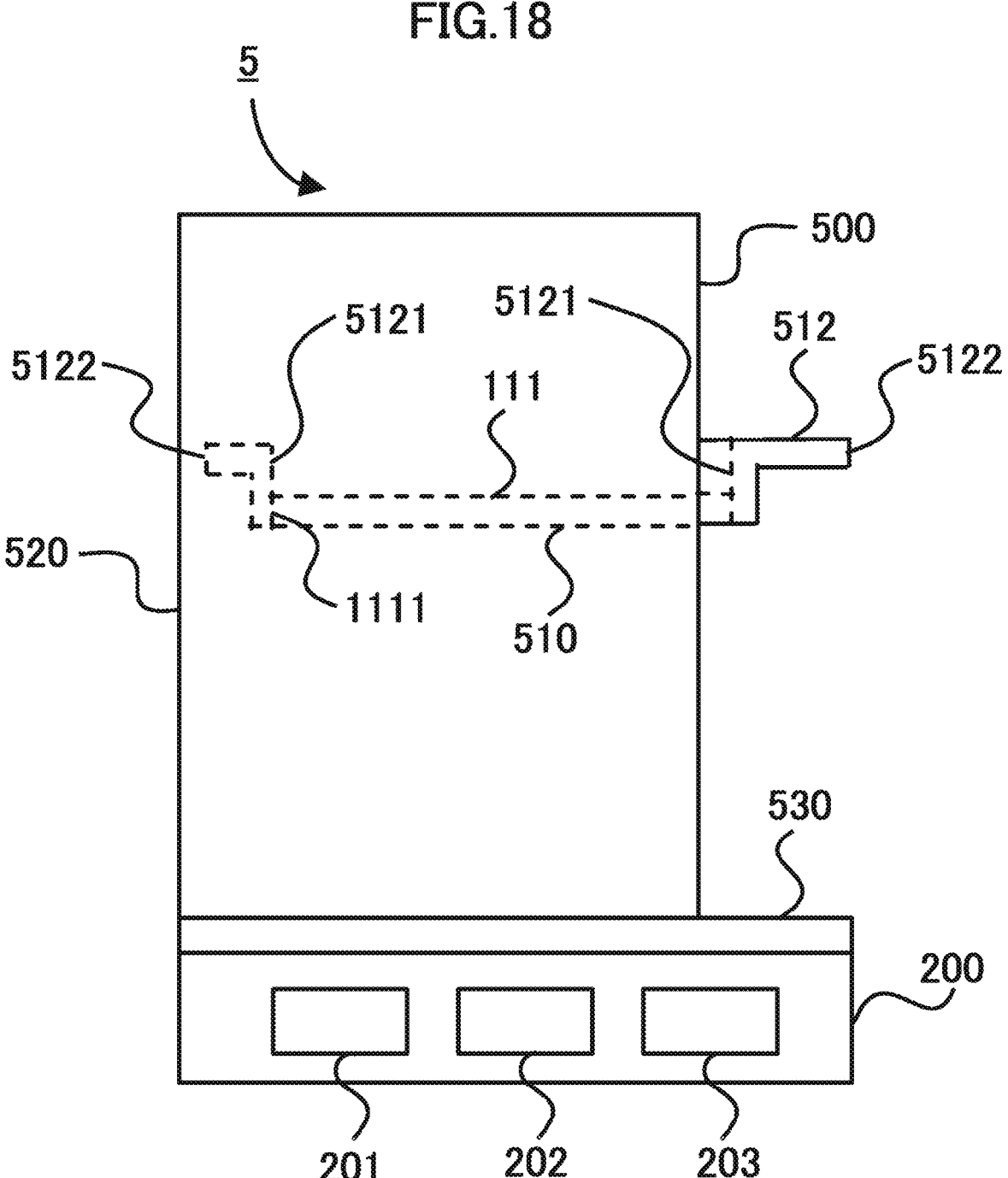
FIG. 18 is a side view of the reading apparatus shown in FIG. 16.
Figure 19:
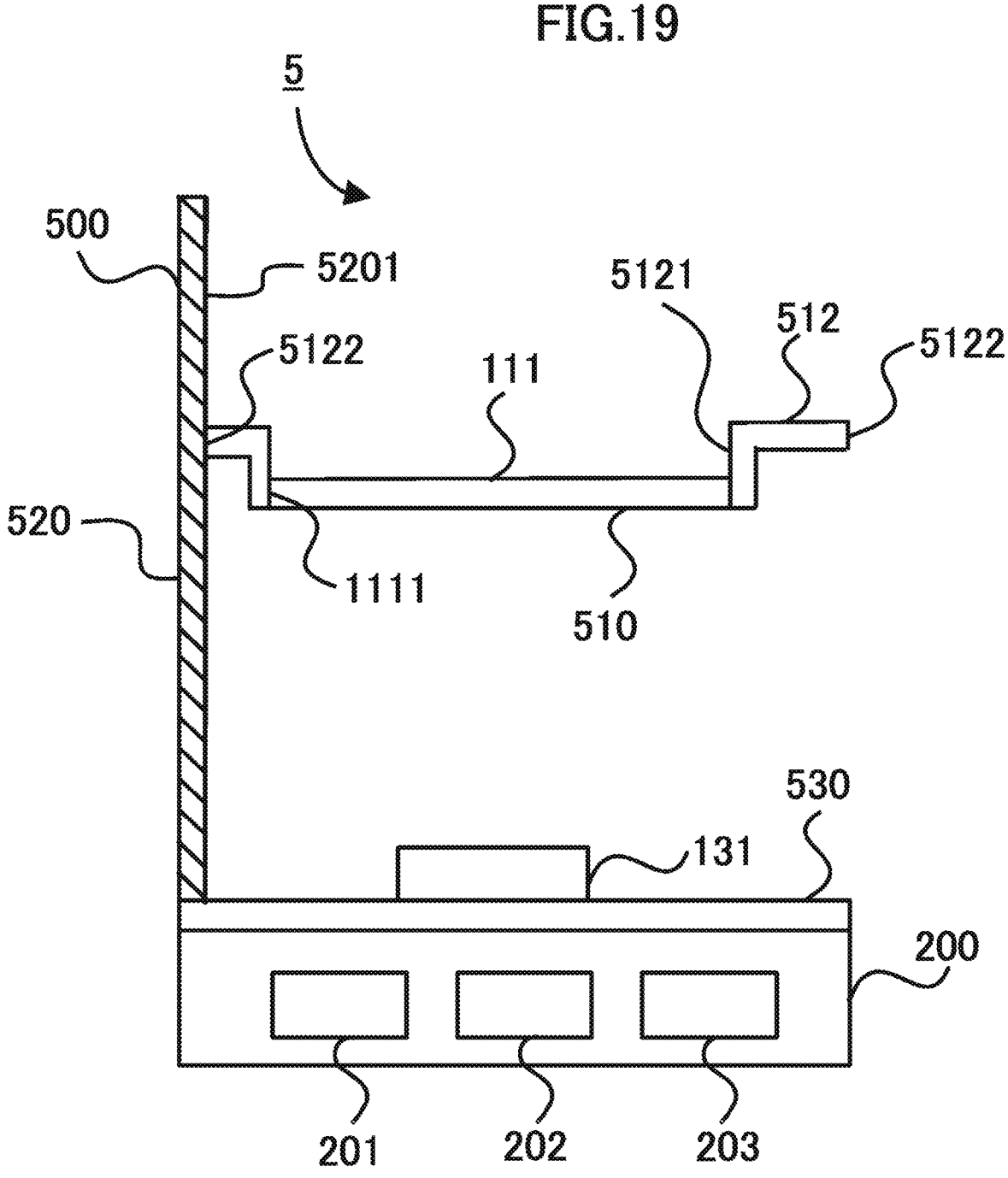
FIG. 19 is a sectional view taken along the line 19-19 of FIG. 16.

FIG. 16 is a top view of an example of the reading apparatus 5 according to the fourth embodiment of the present disclosure. FIG. 17 is a front view of the reading apparatus 5 shown in FIG. 16. FIG. 18 is a side view of the reading apparatus 5 shown in FIG. 16. FIG. 19 is a sectional view taken along the line 19-19 of FIG. 16. The reading apparatus 5 includes a reading unit 500 and a controller 200. The reading unit 500 includes a top part 510, a radio wave absorbing wall 520, a bottom part 530, and an antenna 131. The configuration of the controller 200 is the same as that of the controller 200 in the reading apparatus 1 according to the first embodiment.

The top part 510 includes a placement portion 111 and a prohibition portion 512. The configuration of the placement portion 111 is the same as that of the placement portion 111 in the reading apparatus 1 according to the first embodiment. The prohibition portion 512 is made of a material that allows radio waves to pass through. The prohibition portion 512 has an inner edge 5121 in contact with the outer edge 1111 of the placement portion 111 and surrounds the placement portion 111. There is a gap between an outer edge 1111 of the placement portion 111 and an outer edge 5122 of the prohibition portion 512. The RF tag 301 cannot be placed on the prohibition portion 512.

As shown in FIG. 19, for example, the placement portion 111 is recessed relative to the prohibition portion 512. In this configuration, the article 300 or the shopping basket 302 can be easily placed on the placement portion 111. The placement portion 111 and the prohibition portion 512 may be located on the same plane. In this configuration, it is desirable to provide a mark on the upper surface of the top part 510 so that the placement portion 111 and the prohibition portion 512 can be distinguished from each other.

As shown in FIG. 16, the cross-sectional shape of the radio wave absorbing wall 520 is formed in a U shape. The radio wave absorbing wall 520 consists of an arc section and two protruding sections. The cross-sectional shape of the arc section is, for example, a semicircular arc. The inner surface 5201 of the radio wave absorbing wall 520 is in contact with the outer edge 5122 of the prohibition portion 512 (that is, the outer edge of the top part 510). The two protruding sections of the radio wave absorbing wall 520 protrude from both ends of the arc section, respectively. Therefore, the inner surface 5201 of the radio wave absorption wall 520 is in contact with a part of the outer edge 5122 of the prohibition part 512 (that is, a part of the outer edge of the top part 510).

For example, the radio wave absorbing wall 520 is vertically erected from the outer edge of the bottom part 530 and extends above and below the top part 510. The inner surface 5201 of the radio wave absorbing wall 520 is fixed to a part of the outer edge 5122 of the prohibiting portion 512 (that is, a part of the outer edge of the top part 510). The upper end of the radio wave absorption wall 520 is higher than the upper surface of the top part 510. In the configuration in which the placement portion 111 is recessed relative to the prohibition portion 512, the upper surface of the top portion 510 is the upper surface of the prohibition portion 512. The radio wave absorbing wall 520 needs to extend above and below the top portion 510, and the lower end thereof does not necessarily need to be fixed to the outer edge of the bottom part 530.

The radio wave absorbing wall 520 includes a radio wave absorbing layer to absorb radio waves. The radio wave absorbing wall 520 is made of, for example, a plate material that absorbs radio waves. The radio wave absorbing wall 520 may have a configuration in which a radio wave absorbing sheet is attached to an inner surface of a plate material that allows radio waves to pass through. Also, the radio wave absorbing wall 520 may have a configuration in which a radio wave reflecting sheet is attached to an inner surface of a plate material that allows radio waves to pass through, and a radio wave absorbing sheet is further attached to an inner surface of the radio wave reflecting sheet.

The bottom part 530 is, for example, a flat plate. The bottom part 530 has, for example, a shape in which the lower end of the radio wave absorbing wall 520 can be fixed to the outer edge thereof and the radio wave absorbing wall 520 can be erected. The bottom part 530 may be made only of a material that allows radio waves to pass through, or may include a radio wave absorbing layer that absorbs radio waves or a radio wave reflecting layer that reflects radio waves.

An antenna 131 is located on the upper surface of the bottom part 530. The configuration of the antenna 131 is the same as that of the antenna 131 in the reading apparatus 1 according to the first embodiment. The antenna 131 is below the placement portion 111. The antenna 131 is located at a position where a radio wave with high intensity is radiated toward the placement portion 111 and a radio wave with lower intensity than that of the radio wave radiated toward the placement portion 111 is radiated toward the prohibition portion 512. When the antenna 131 radiates a circularly polarized radio wave, it is desirable that the antenna 131 is located so that the center of an area where the radio wave is radiated is positioned directly below the center of the placement portion 111.

Figure 20:
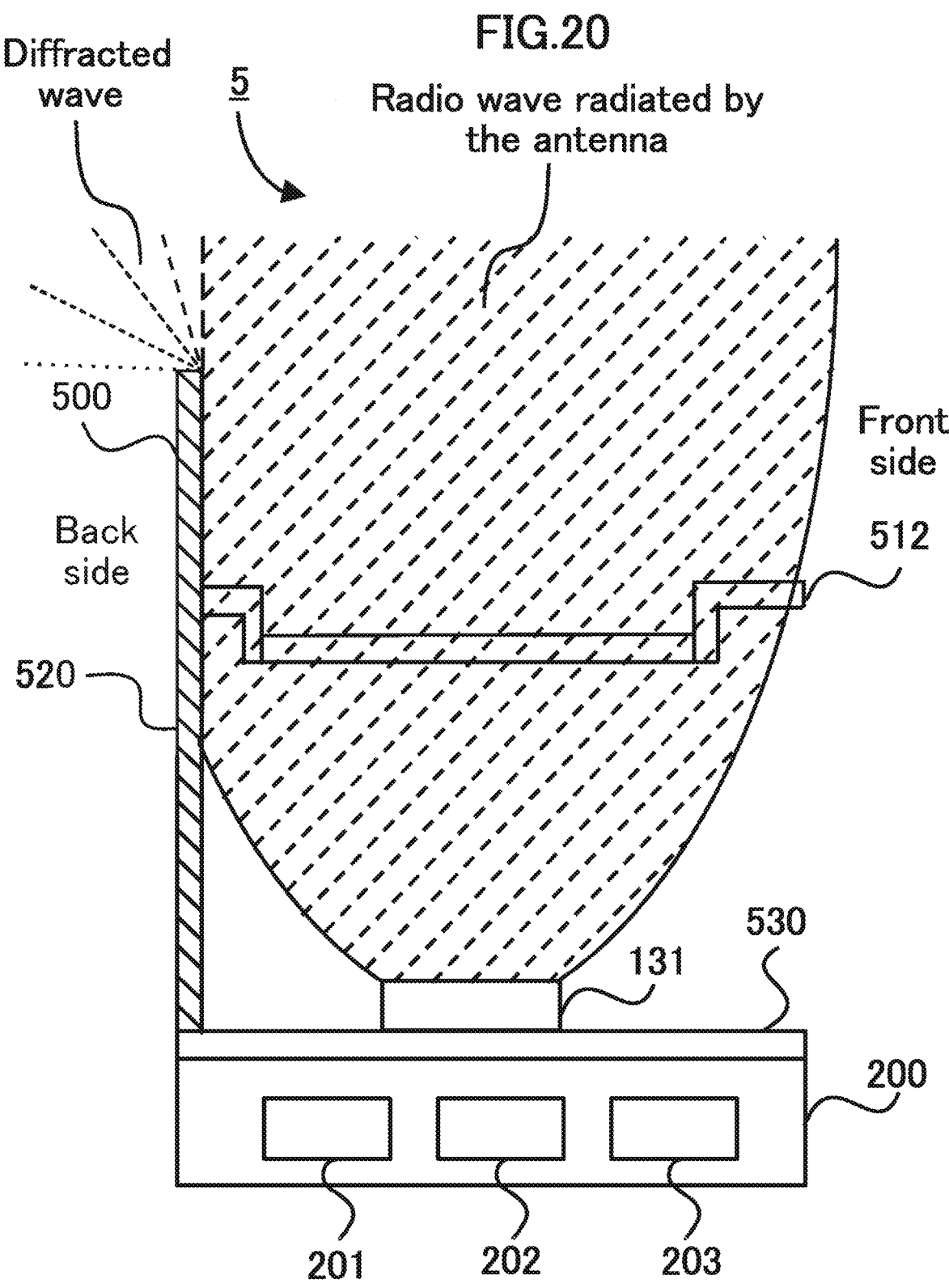
FIG. 20 shows an example of a radio wave radiated by the antenna in the reading apparatus according to the fourth embodiment.

FIG. 20 shows an example of a radio wave radiated by the antenna 131 in the reading apparatus 5 according to the fourth embodiment. FIG. 20 shows an example of a radio wave radiated by the antenna 131 on the cross-sectional view shown in FIG. 19. In the example of FIG. 20, the RF tag 301 that receives the radio wave in the range indicated by the diagonally right-up dashed line operates and transmits the response radio wave. On the front side, the gap between the outer edge 1111 of the placement portion 111 and the outer edge 5122 of the prohibition portion 512 is larger than that on the back side. On the front side, the radio wave radiated by the antenna 131 is attenuated to the intensity at which the RF tag 301 does not operate when it reaches the outer edge 5122 of the prohibition portion 512. That is, on the front side, the transmission/reception part 201 causes the antenna 131 to radiate a radio wave with the intensity at which the RF tag 301 does not operate when the radio wave reaches the outer edge 5122 of the prohibition portion 512.

Also, on the back side, the radio wave radiated by the antenna 131 is attenuated when it reaches the prohibition portion 512. When the radio wave reaches the upper end of the radio wave absorbing wall 520, the radio wave is further attenuated. This radio wave is diffracted at the upper end of the radio wave absorbing wall 520 to generate a diffracted wave. The intensity of the diffracted wave is further lower than the intensity of the radio wave that has reached the upper end of the radio wave absorbing wall 520. On the back side, the transmission/reception part 201 causes the antenna 131 to radiate a radio wave with the intensity at which the RF tag 301 does not operate due to the diffracted wave. On the back side, there is a gap between the outer edge 1111 of the placement portion 111 and the outer edge 5122 of the prohibition portion 512, and there is the radio wave absorption wall 520. As a result, the intensity of the radio wave that is radiated by the antenna 131 and reaches the RF tag 301 on the placement portion 111 is larger than predetermined intensity, and the intensity of the radio wave that is radiated by the antenna 131 and reaches the RF tag 301 around the top part 510 is the intensity that does not allow the RF tag 301 to operate.

For example, when the longitudinal direction of the antenna of an RF tag 301 is nearly perpendicular to the main surface of the antenna 131 or when a plurality of RF tags 301 overlap each other, the radio wave received by the antenna of the RF tag 301 is weakened. However, the intensity of the radio wave radiated by the antenna 131 toward the placement portion 111 is high. Therefore, the RF tag 301 attached to the article 300 placed on the upper surface of the placement portion 111 operates. The transmission/reception part 202 can obtain information from the RF tag 301 attached to the article 300 placed on the upper surface of the placement portion 111. There is a low possibility that the transmission/reception part 201 fails to read information from the RF tag 301 placed on the upper surface of the placement portion 111.

In contrast, the intensity of the radio wave radiated by the antenna 131 toward the prohibition portion 512 is low. If the RF tag 301 is placed on the upper surface of the prohibition portion 512, the RF tag 301 may not operate in a case where the longitudinal direction of the antenna of the RF tag 301 is nearly perpendicular to the main surface of the antenna 131 or in a case where a plurality of RF tags 301 overlap each other. Therefore, there is a possibility that the transmission/reception part 201 may fail to read information from the RF tag 301. However, the RF tag 301 is not placed on the upper surface of the prohibition portion 512. Since the radio wave that is radiated by the antenna 131 and reaches an RF tag 301 around the top part 110 has the intensity that does not allow the RF tag 301 to operate, the transmission/reception part 201 can exclude the RF tag 301 around the top part 510 from a target from which information is read.

Also, a store usually has a ceiling. When the reading apparatus 5 is used in a store, a radio wave radiated by the antenna 131 may be reflected by the ceiling and reach the RF tag 301 around the top part 510 (That is, the RF tag 301 that is not placed on the top part 510). However, the radio wave is attenuated before reaching the ceiling, and the radio wave reflected by the ceiling is further attenuated before reaching the RF tag 301 around the top part 510. The transmission/reception part 201 causes the antenna 131 to radiate the radio wave with the intensity at which the RF tag 301 around the top part 510 does not operate due to the radio wave reflected by the ceiling.

If the RF tag 301 does not operate, it does not transmit the response radio wave. Therefore, the reading apparatus 5 does not obtain information from the RF tag 301 around the top part 510. As a result, there is a low possibility that the reading apparatus 5 fails to read information from an RF tag 301 placed on the upper surface of the placement portion 111. And the reading apparatus 5 can prevent accidentally reading information from an RF tag 301 around the top part 510.

If there is no prohibition portion 512 between the placement portion 111 and the radio wave absorption wall 520 and the inner surface 5201 of the radio wave absorption wall 520 is in contact with the outer edge 1111 of the placement portion 111, the radio wave absorption wall 520 must be high enough to attenuate the radio wave that is radiated from the antenna 131 and reaches the upper end of the radio wave absorption wall 520 to the intensity at which RF tag 301 does not operate due to the diffracted wave generated in the upper end of the radio wave absorption wall 520. However, there is a gap between the outer edge 1111 of the placement portion 111 and the inner surface 5201 of the radio wave absorbing wall 520. The radio wave radiated by the antenna 131 is attenuated when it reaches the prohibition portion 512. When the radio wave reaches the upper end of the radio wave absorbing wall 520, the radio wave is further attenuated. Therefore, the height of the radio wave absorbing wall 520 can be reduced in accordance with the distance between the outer edge 1111 of the placement portion 111 and the inner surface 5201 of the radio wave absorbing wall 520.

Figure 21:
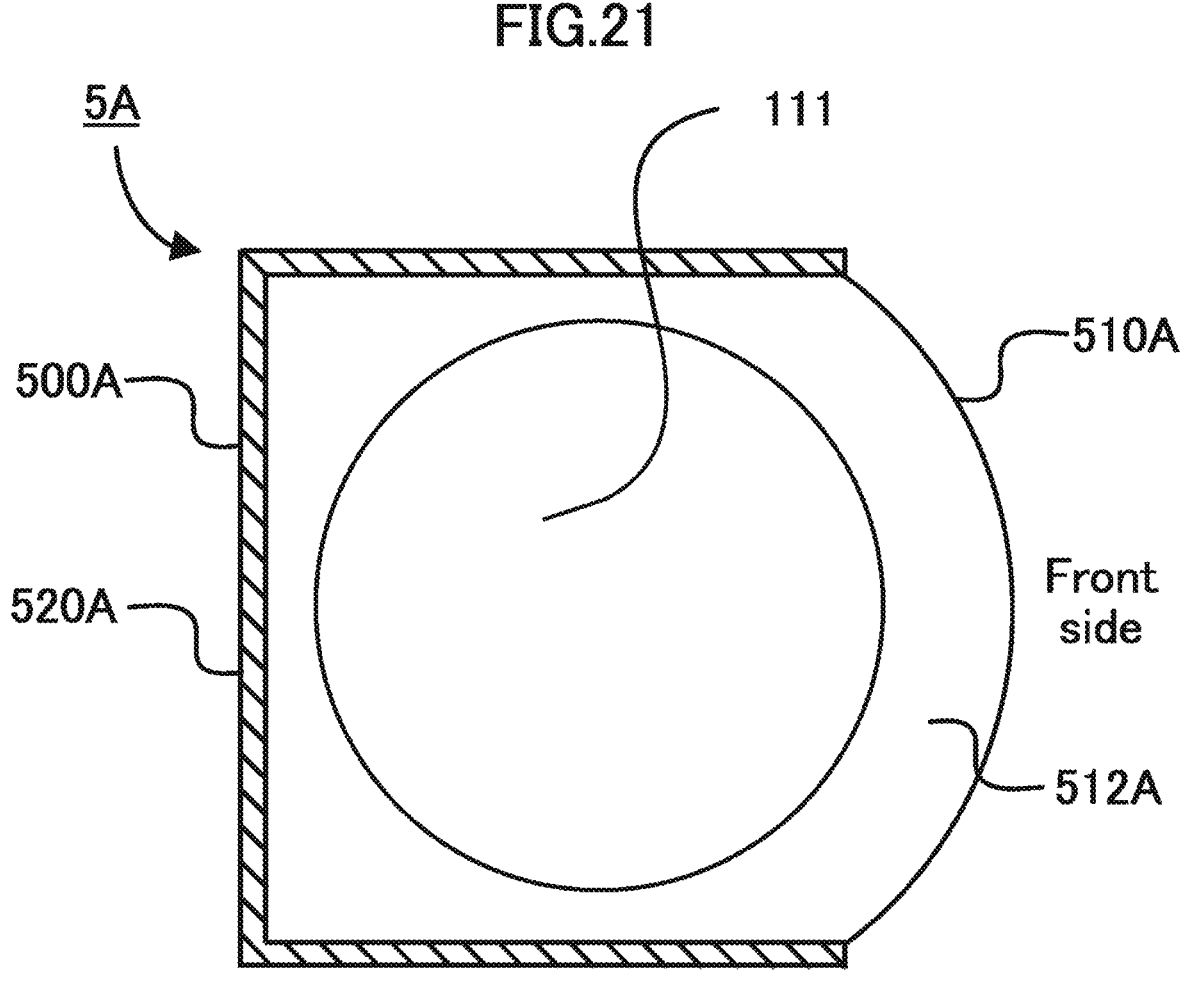
FIG. 21 is a top view of a reading apparatus that is the first modification of the reading apparatus according to the fourth embodiment.

FIG. 21 is a top view of a reading apparatus 5A that is the first modification of the reading apparatus 5 according to the fourth embodiment. The reading apparatus 5A includes a reading unit 500A and a controller 200 (not illustrated). The reading unit 500A includes a top part 510A, a radio wave absorbing wall 520A, a bottom part (not illustrated), and an antenna 131 (not illustrated). The top part 510A includes a placement portion 111 and a prohibition portion 512A. The radio wave absorbing wall 520A is composed of a left flat plate, a back flat plate and a right flat plate. Each of the left flat plate, the back flat plate and the right flat plate is vertically erected from the bottom part and is disposed in contact with a part of the outer edge of the top part 510A. Accordingly, the shape of the prohibition portion 512A is different from the shape of the prohibition portion 512. The upper end of the radio wave absorbing wall 520A is higher than the upper surface of top part 510A. In this case, the upper surface of the top part 510A is the upper surface of the prohibition portion 512A. In other respects, the configuration of the reading apparatus 5A is the same as that of the reading apparatus 5.

Figure 22:
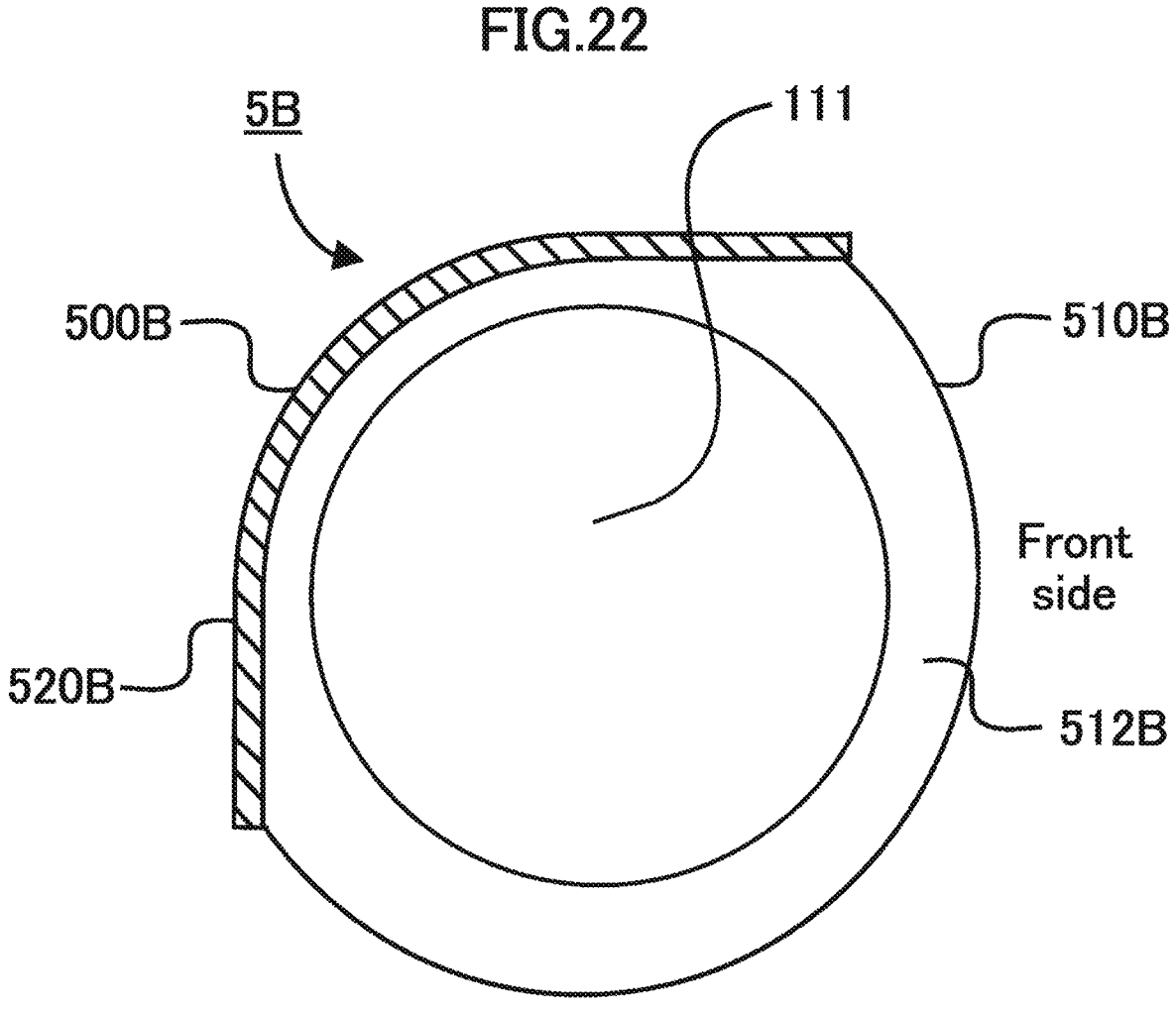
FIG. 22 is a top view of a reading apparatus that is the second modification of the reading apparatus according to the fourth embodiment.

FIG. 22 is a top view of a reading apparatus 5B that is the second modification of the reading apparatus 5 according to the fourth embodiment. The reading apparatus 5B includes a reading unit 500B and a controller 200 (not illustrated). The reading unit 500B includes a top part 510B, a radio wave absorbing wall 520B, a bottom part (not illustrated), and an antenna 131 (not illustrated). The top part 510B includes a placement portion 111 and a prohibition portion 512B. The radio wave absorption wall 520B consists of an arc section and two protruding sections. Also, the upper end of the radio wave absorption wall 520B is higher than the upper surface of the top part 510B. The cross section of the radio wave absorbing wall 520B is nearly formed in an L shape, and the cross section of the arc section is an arc of a quadrant. Accordingly, the shape of the prohibition portion 512B is different from the shape of the prohibition portion 512. The upper surface of the top part 510B is the upper surface of the prohibition portion 512B. In other respects, the configuration of the reading apparatus 5B is the same as that of the reading apparatus 5.

Figure 23:
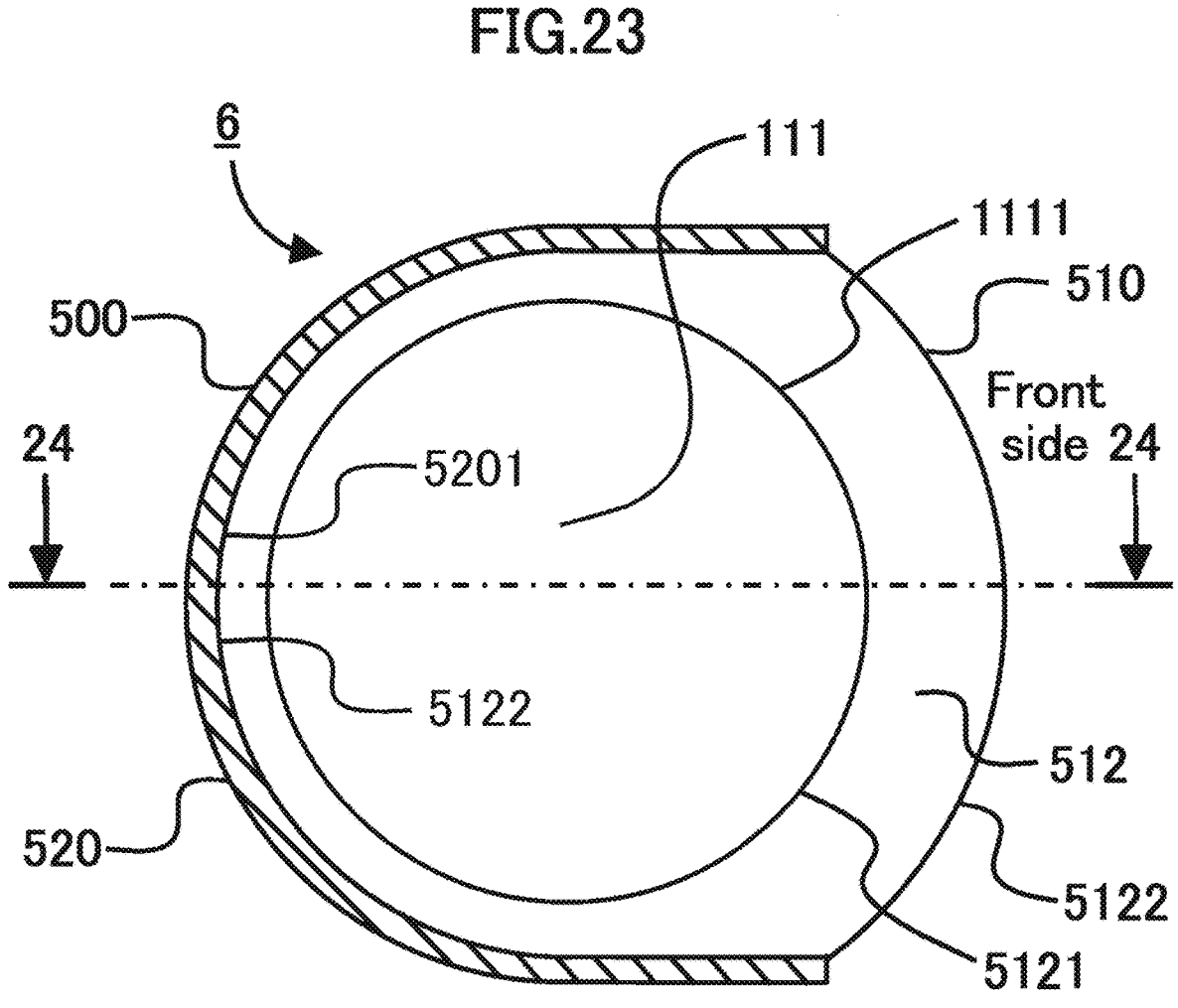
FIG. 23 is a top view of an example of the reading apparatus according to the fifth embodiment of the present disclosure.
Figure 24:
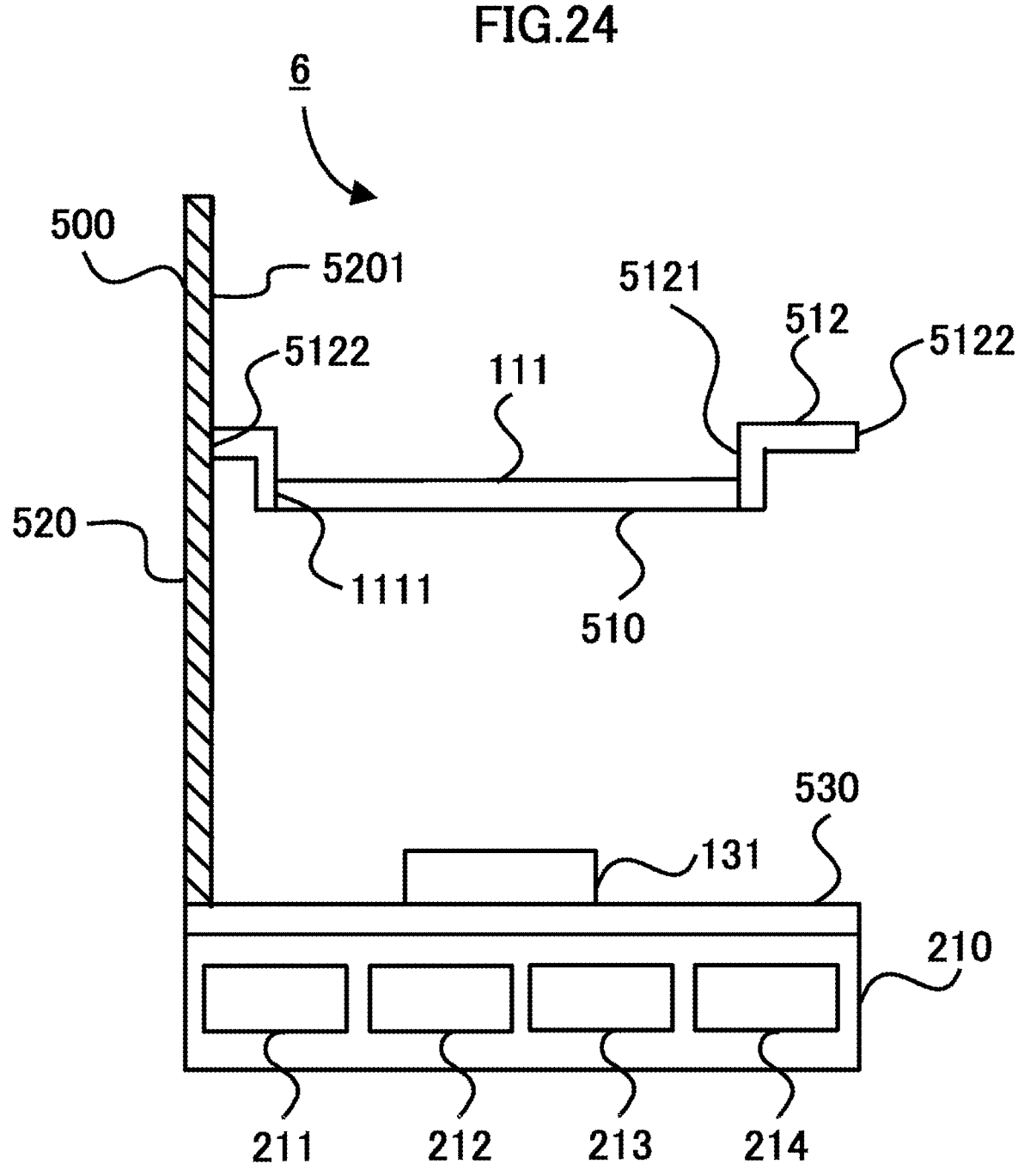
FIG. 24 is a sectional view taken along the line 24-24 of FIG. 23.

FIG. 23 is a top view of an example of the reading apparatus 6 according to the fifth embodiment of the present disclosure. FIG. 24 is a sectional view taken along the line 24-24 of FIG. 23. The reading apparatus 6 includes a reading unit 500 and a controller 210. The configuration of the controller 500 is the same as that of the controller 500 in the reading apparatus 4 according to the fourth embodiment. The configuration of the controller 210 is the same as that of the controller 210 in the reading apparatus 3 according to the second embodiment.

The radio wave output of the antenna 131 in the reading apparatus 6 according to the fifth embodiment is larger than that of the reading apparatus 4 according to the fourth embodiment. In the reading apparatus 6, the RF tag 301 around the top part 510 may operate to transmit a response radio wave. However, there is a gap between the outer edge 1111 of the placement portion 111 and the outer edge 5122 of the prohibition portion 512, and there is the radio wave absorption wall 520. As a result, there is a difference between the intensity of the radio wave that is radiated by the antenna 131 and reaches the RF tag 301 on the placement portion 111 and the intensity of the radio wave that is radiated by the antenna 131 and reaches the RF tag 301 around the top part 510. Accordingly, as described below, the reading apparatus 6 can determine whether the RF tag 301 is on the placement portion 111 or the RF tag 301 is around the top part 510.

On the front side, the gap between the outer edge 1111 of the placement portion 111 and the outer edge 5122 of the prohibition portion 512 is larger than that on the back side. On the front side, the radio wave radiated by the antenna 131 is attenuated to the intensity at which the determination part 212 can determine that the RF tag 301 is around the top part 510 when it reaches the outer edge 5122 of the prohibition portion 512. That is, on the front side, the transmission/reception part 211 causes the antenna 131 to radiate a radio wave with the intensity at which the determination part 212 can determine that the RF tag 301 is around the top part 510 when the radio wave reaches the outer edge 5122 of the prohibition portion 512. In addition, the RF tag 301 is not placed on the upper surface of the prohibition portion 512. There is a large difference between the intensity of the radio wave on the placement portion 111 and the intensity of the radio wave leaking around the top part 510. The intensity of the radio wave on the placement portion 111 is much larger than the intensity of the radio wave leaking around the top part 510. The determination part 212 can easily determine whether the RF tag 301 is on the placement portion 111 or the RF tag 301 is around the top part 510.

Also, on the back side, the radio wave radiated by the antenna 131 is attenuated when it reaches the prohibition portion 512. When the radio wave reaches the upper end of the radio wave absorbing wall 520, the radio wave is further attenuated. This radio wave is diffracted at the upper end of the radio wave absorbing wall 520 to generate a diffracted wave. The intensity of the diffracted wave is further lower than the intensity of the radio wave that has reached the upper end of the radio wave absorbing wall 520. The determination part 212 can easily determine whether the RF tag 301 is on the placement portion 111 or the RF tag 301 is around the top part 510. On the back side of the reading apparatus 6, there is a gap between the outer edge 1111 of the placement portion 111 and the outer edge 5122 of the prohibition portion 512, and there is the radio wave absorption wall 520. As a result, the intensity of the radio wave that is radiated by the antenna 131 and reaches the RF tag 301 on the placement portion 111 is larger than predetermined intensity, and the radio wave that is radiated by the antenna 131 and reaches the RF tag 301 around the top part 510 has the intensity with which the determination part 212 can determine that the RF tag 301 is around the top part 510.

For example, when the longitudinal direction of the antenna of an RF tag 301 is nearly perpendicular to the main surface of the antenna 131 or when a plurality of RF tags 301 overlap each other, the radio wave received by the antenna of the RF tag 301 is weakened. However, the intensity of the radio wave radiated by the antenna 131 toward the placement portion 111 is high. Therefore, the RF tag 301 attached to the article 300 placed on the upper surface of the placement portion 111 operates. The transmission/reception part 211 can obtain information from the RF tag 301 attached to the article 300 placed on the upper surface of the placement portion 111. There is a low possibility that the transmission/reception part 211 fails to read information from the RF tag 301 placed on the upper surface of the placement portion 111.

In contrast, the intensity of the radio wave radiated by the antenna 131 toward the prohibition portion 512 is low. If the RF tag 301 is placed on the upper surface of the prohibition portion 512, the determination part 212 may determine that the RF tag 301 is around the top part 510 in a case where the longitudinal direction of the antenna of the RF tag 301 is nearly perpendicular to the main surface of the antenna 131 or in a case where a plurality of RF tags 301 overlap each other. However, the RF tag 301 is not placed on the upper surface of the prohibition portion 512. Since the radio wave that is radiated by the antenna 131 and reaches an RF tag 301 around the top part 510 has the intensity with which determination part 212 can determine that the RF tag 301 is around the top part 510, the transmission/reception part 211 can exclude the RF tag 301 around the top part 510 from a target from which information is read.

Also, a store usually has a ceiling. When the reading apparatus 6 is used in a store, a radio wave radiated by the antenna 131 may be reflected by the ceiling and reach the RF tag 301 around the top part 510 (That is, the RF tag 301 that is not placed on the top part 510). However, the radio wave is attenuated before reaching the ceiling, and the radio wave reflected by the ceiling is further attenuated before reaching the RF tag 301 around the top part 510. The radio wave that is radiated upward by the antenna 131, reflected by the ceiling, and reaches an RF tag 301 around the top part 510 has the intensity at which the determination part 212 determines that the RF tag 301 is around the top part 510.

Therefore, there is a low possibility that the reading apparatus 6 fails to read information from an RF tag 301 placed on the upper surface of the placement portion 111. And the reading apparatus 6 can prevent accidentally reading information from an RF tag 301 around the top part 510.

The diffracted wave generated at the upper end of the radio wave absorbing wall 520 needs to be attenuated to an intensity that the determination part 212 can determine that the RF tag 301 is around the top part 510. In the reading apparatus 6, there is a gap between the outer edge 1111 of the placement portion 111 and the inner surface 5201 of the radio wave absorbing wall 520. The radio wave radiated by the antenna 131 is attenuated when it reaches the prohibition portion 512. When the radio wave reaches the upper end of the radio wave absorbing wall 520, the radio wave is further attenuated. Therefore, the height of the radio wave absorbing wall 520 can be reduced in accordance with the distance between the outer edge 1111 of the placement portion 111 and the inner surface 5201 of the radio wave absorbing wall 520.

Similarly to the reading apparatus 5 according to the fourth embodiment, the reading apparatus 6 according to the fifth embodiment may also be configured to include the reading unit 500A shown in FIG. 21 and the controller 210, or the reading unit 500B shown in FIG. 22 and the controller 210.

Figure 25:
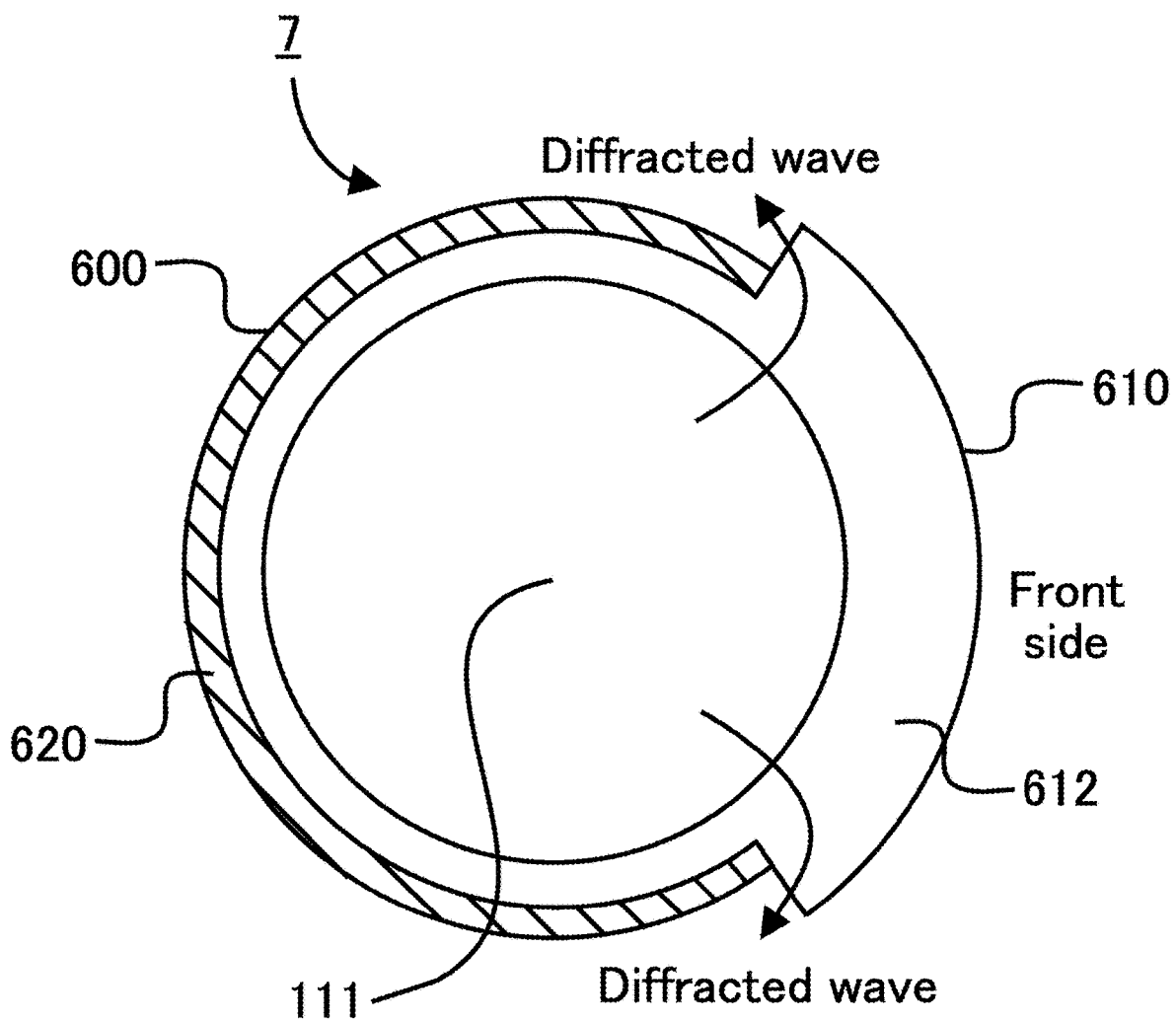
FIG. 25 is a top view of a reading apparatus that is a comparative example of the reading apparatus according to the fourth embodiment of the present disclosure.

FIG. 25 is a top view of a reading apparatus 7 that is a comparative example of the reading apparatus 5 according to the fourth embodiment of the present disclosure. The reading apparatus 7 includes a reading unit 600 and a controller 200 (not illustrated). The reading unit 600 includes a top part 610, a radio wave absorbing wall 620, a bottom part (not illustrated), and an antenna 131 (not illustrated). The top part 610 includes a placement portion 111 and a prohibition portion 612. Unlike the radio wave absorbing wall 520 included in the reading apparatus 5 according to the fourth embodiment, the radio wave absorbing wall 620 includes only an arc section and does not include two protruding sections. Accordingly, the shape of the prohibition portion 612 is different from the shape of the prohibition portion 512. In other respects, the configuration of the reading apparatus 7 is the same as that of the reading apparatus 5.

As shown in FIG. 25, in the reading apparatus 7 of the comparative example, the radio wave radiated by the antenna 131 is diffracted at both ends of the arc section of the radio wave absorbing wall 620 to generate a diffracted wave. The diffracted wave is relatively strong. Therefore, the RF tag 301 around the top part 610 may be operated by the diffracted wave. In contrast, the diffracted waves generated at the tips of the two protruding sections in the radio wave absorbing wall 520 of the reading apparatus 5 according to the fourth embodiment are weak. Therefore, in the reading apparatus 5, the RF tag 301 around the top part 510 does not operate.

In the above-described embodiments, the examples in which the reading apparatus and the RF tag communicate with each other using a radio wave in the UHF band of the frequencies 860-960 MHz have been described. However, the reading apparatus and the RF tag may communicate with each other using a radio wave in the other frequencies.

Also, in the above-described embodiments, a commodity has been described as an example of an article. However, an article may not be limited to a commodity. An article may be the other article such as a sample, a document, a book, a medicine, and a key. In addition, in the above-described embodiments, the examples in which each reading apparatus of the present disclosure is used in a cash register or a self-checkout machine of a store have been described. However, the application of each reading apparatus of the present disclosure is not limited thereto. Each reading apparatus of the present disclosure may be used in another application such as a management device for a sample, a document, a book, a medicine, and a key.

Figure 26:
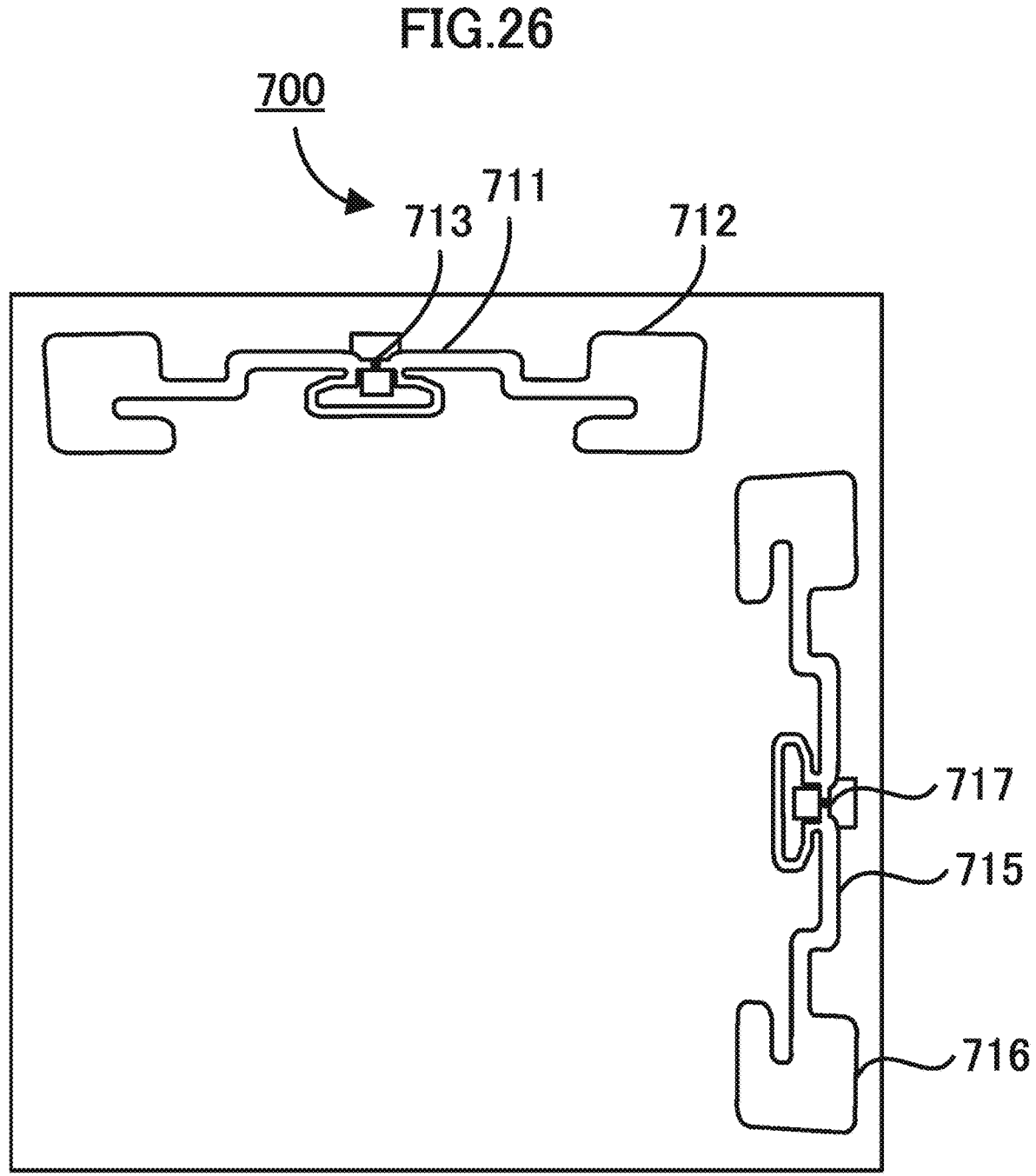
FIG. 26 is a plan view of an example of an RF tag sheet including duplex RF tags.
Figure 27:
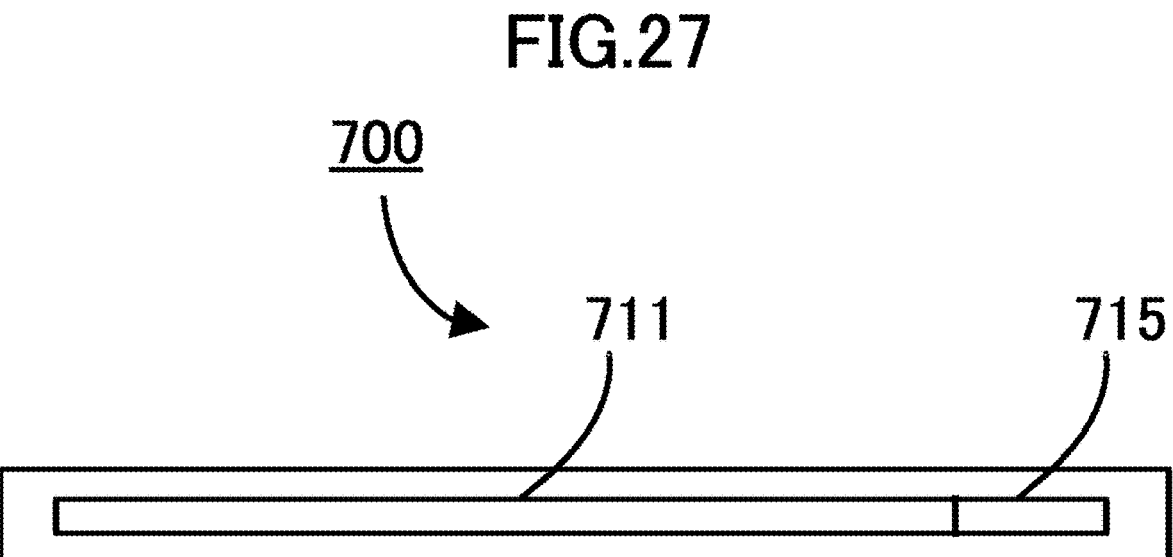
FIG. 27 is a front view of the RF tag sheet shown in FIG. 26.

FIG. 26 is a plan view of an example of an RF tag sheet 700 including duplex RF tags 711,715. FIG. 27 is a front view of the RF tag sheet 700 shown in FIG. 26. The RF tag sheet 700 includes the RF tag 711 and the RF tag 715. The RF tag 711 and the RF tag 715 are passive RF tags. The main surface of the RF tag 711 and the main surface of the RF tag 715 are on the same plane. As shown in FIG. 27, the RF tag sheet 700 is thin. The RF tag 711 and the RF tag 715 are sandwiched by thin hard papers from the front surface and the back surface. The hard papers allow radio waves to pass through. The RF tag 711 and the RF tag 715 do not overlap each other and are arranged so that their longitudinal directions are perpendicular to each other. The RF tag 711 and the RF tag 715 are arranged in, for example, an L shape.

The RF tag 711 includes an antenna 712 and an IC chip 713. The RF tag 711 communicates with an RFID reader/writer by, for example, a radio wave in the UHF band of frequencies 860-960 MHz. When the antenna 712 receives a radio wave radiated by an antenna of an RFID reader/writer, the power is generated. The IC chip 713 is operated by the power. The IC chip 713 stores information including a unique tag ID. The RF tag 711 transmits a response radio wave in response to a radio wave radiated by an antenna of an RFID reader/writer. The response radio wave includes information including the tag ID.

The RF tag 715 includes an antenna 716 and an IC chip 717. When the antenna 716 receives a radio wave radiated by an antenna of an RFID reader/writer, the power is generated. The IC chip 717 is operated by the power. The RF tag 715 operates in the same manner as the RF tag 711. The same information including the tag ID may be stored in the IC chip 713 and the IC chip 717, or the same information except the tag ID may be stored although the tag IDs are different. The information stored in the IC chip 713 and the information stored in the IC chip 717 may be different from each other.

The longitudinal direction of the antenna 712 and the longitudinal direction of the antenna 716 are perpendicular to each other. Therefore, when the antenna 712 may not receive the radio wave, the antenna 716 may receive the radio wave and the RF tag 715 can transmit the response radio wave. Also, depending on the direction of the antenna of an RFID reader/writer and the direction of the antenna 716, the antenna 716 may be unable to receive a radio wave and RF tag 715 may be unable to transmit a response radio wave. However, when the antenna 716 may not receive the radio wave, the antenna 712 may receive the radio wave and the RF tag 711 may transmit the response radio wave.

Figure 28:
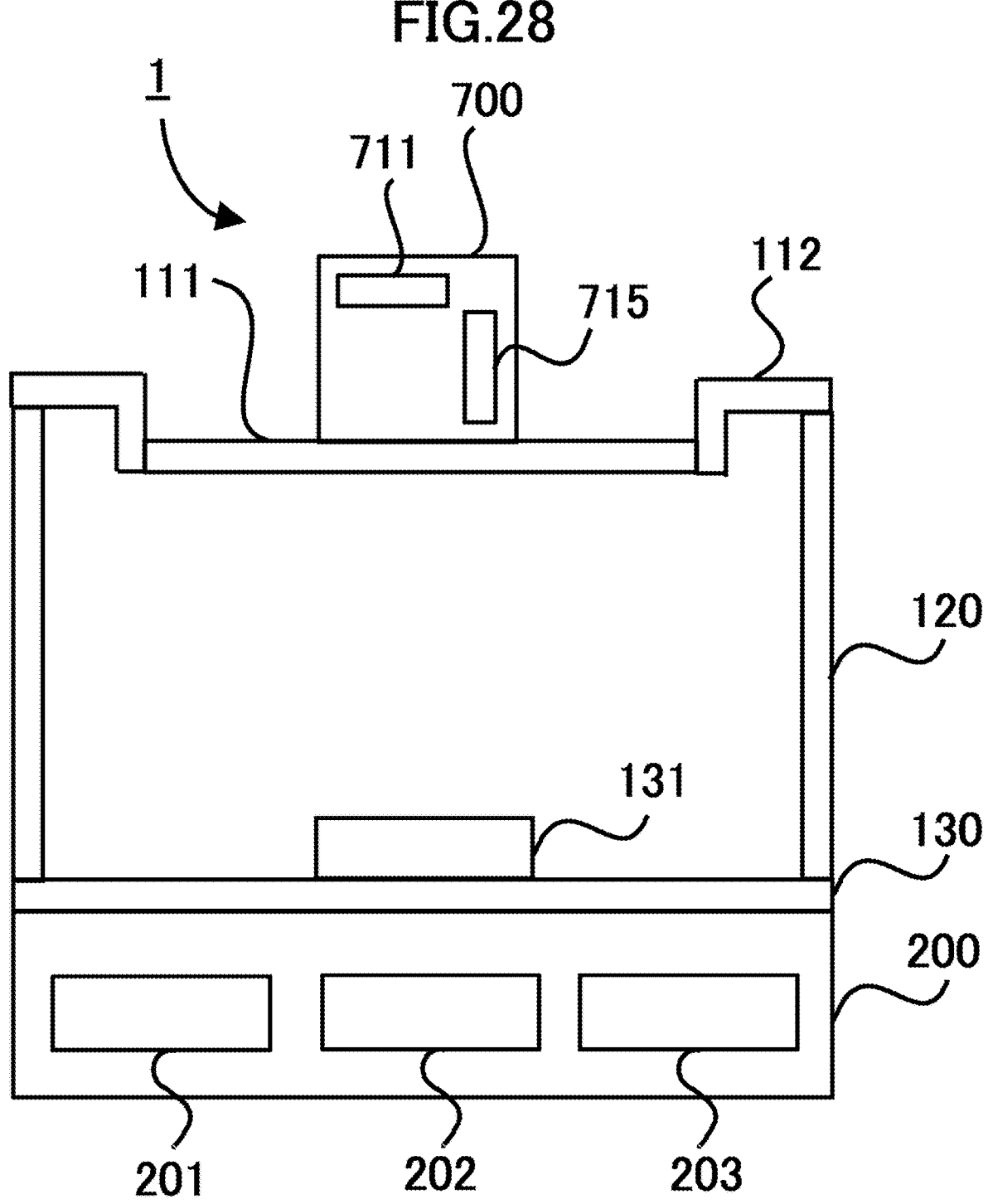
FIG. 28 shows an example in which the RF tag sheet is placed on the placement portion of the reading apparatus shown in FIG. 1.

FIG. 28 shows an example in which the RF tag sheet 700 is placed on the placement portion 111 of the reading apparatus 1 shown in FIG. 1. The RF tag sheet 700 is placed on the placement portion 111 so that the longitudinal direction of the RF tag 711 is parallel to the main surface of the antenna 131. The longitudinal direction of the RF tag 715 is perpendicular to the main surface of the antenna 131. In this case, the acquisition part 202 cannot acquire information from the RF tag 715, but can acquire information from the RF tag 711.

Figure 29:
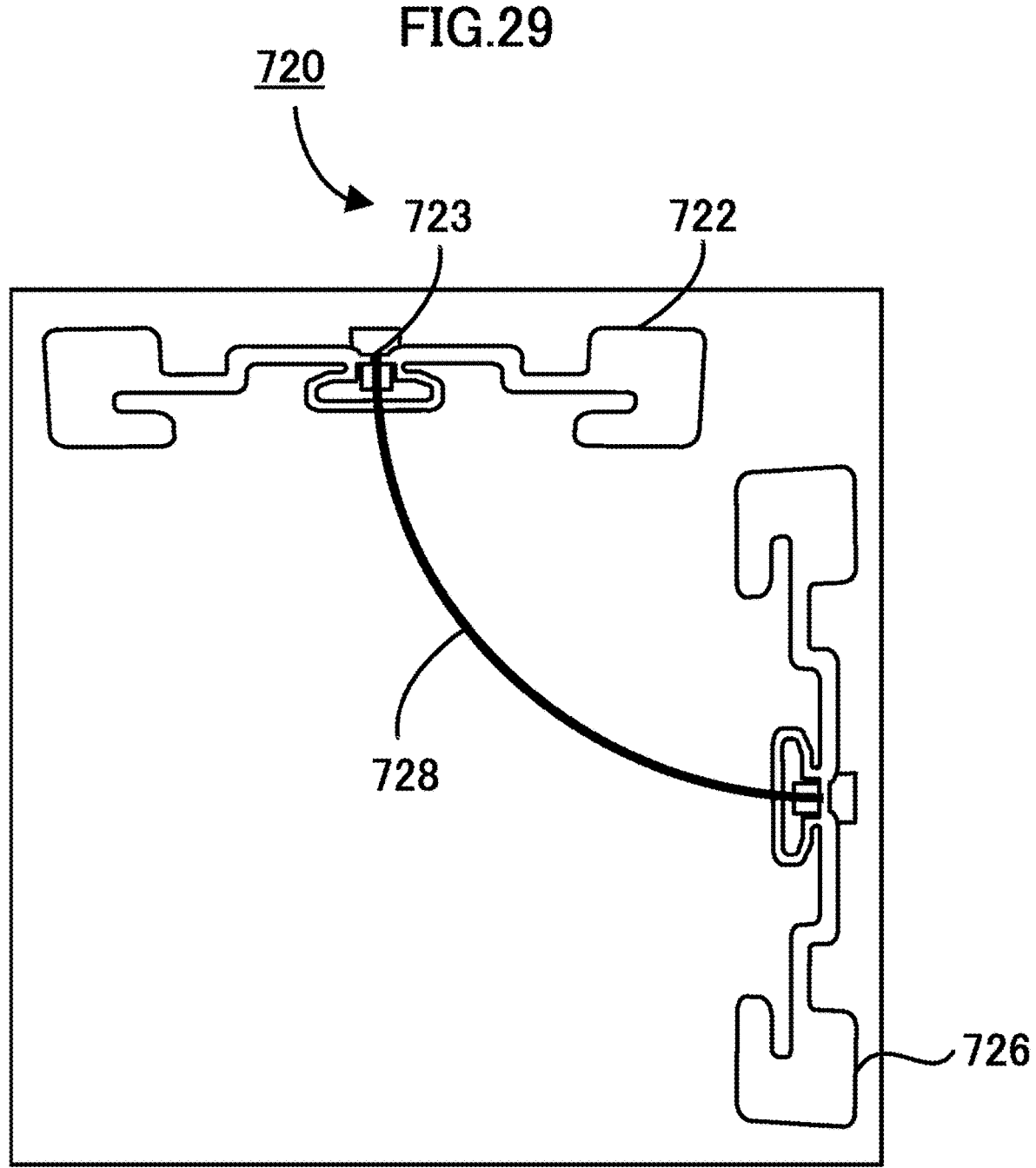
FIG. 29 shows a plan view of an RF tag sheet that is a configuration example different from the RF tag sheet of FIG. 26.
Figure 30:
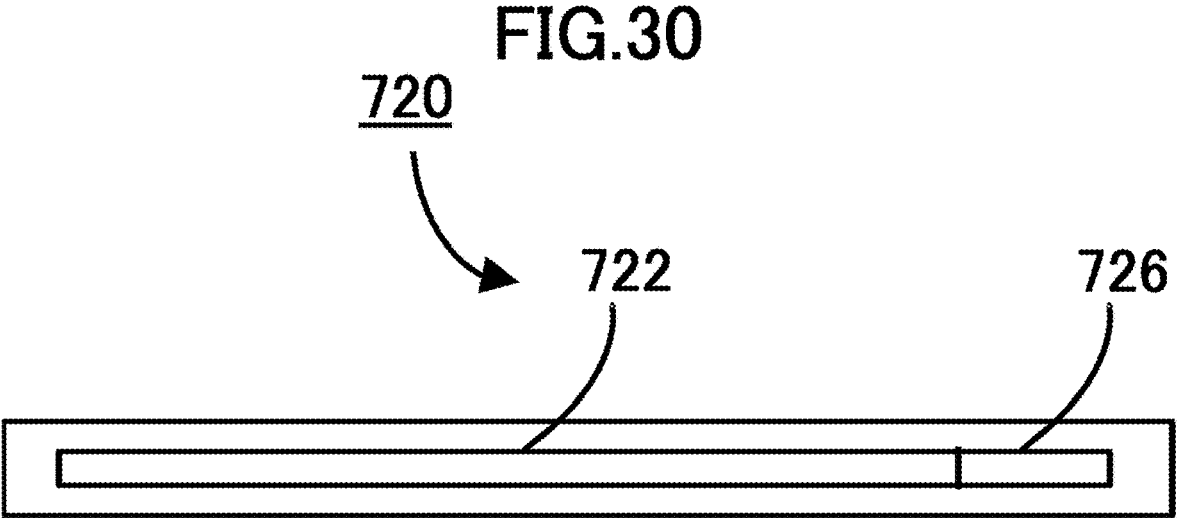
FIG. 30 is a front view of the RF tag sheet shown in FIG. 29.

FIG. 29 shows a plan view of an RF tag sheet 720 that is a configuration example different from the RF tag sheet 700 of FIG. 26. FIG. 30 is a front view of the RF tag sheet 720 shown in FIG. 29. The RF tag sheet 720 includes an antenna 722, an antenna 726, and an IC chip 723. The main surface of the antenna 722 and the main surface of the antenna 726 are on the same plane. As shown in FIG. 30, the RF tag sheet 720 is thin. The antenna 722, the antenna 726, and the IC chip 723 are sandwiched by thin hard papers from the front surface and the back surface. The hard papers allow radio waves to pass through. The IC chip 723 is attached to a central portion of the antenna 722. The IC chip 723 stores information including a tag ID.

The antenna 722 and the antenna 726 do not overlap each other and are arranged so that their longitudinal directions are perpendicular to each other. The antenna 722 and the antenna 726 are arranged in, for example, an L shape. A central portion of the antenna 726 is connected to the IC chip 723 by a wiring 728. The RF tag sheet 720 communicates with an RFID reader/writer by, for example, a radio wave in the UHF band of frequencies 860-960 MHz.

When at least one of the antenna 722 and the antenna 726 receives a radio wave radiated by an antenna of an RFID reader/writer, the power is generated. For example, when the antenna 726 receives a radio wave radiated by an antenna of the RFID reader/writer, the power is generated. A part of the power is supplied to the IC chip 723 via the wiring 728. The IC chip 723 is operated by the power. Information stored in the IC chip 723 is transmitted to the antenna 726 through the wiring 728. The antenna 726 transmits a response radio wave including the information. That is, the antenna 722 and the antenna 726 transmit response radio waves including information stored in the IC chip 723.

FIG. 26 has illustrated an example in which the RF tag 711 and the RF tag 715 are arranged in an L shape so as not to overlap with each other. However, as long as the longitudinal direction of RF tag 711 and the longitudinal direction of RF tag 715 are orthogonal to each other, they are not necessarily arranged in an L shape. Similarly, as long as the longitudinal direction of antenna 722 and the longitudinal direction of antenna 726 are orthogonal to each other, they are not necessarily arranged in an L shape.

Also, in the above-described example of the RF tag sheet 700, an example in which the RF tag 711 and the RF tag 715 are sandwiched by thin hard paper from the front surface and the back surface has been described. However, for example, the RF tag 711 and the RF tag 715 may be attached to a thin plastic plate or a resin film. Similarly, the antenna 722 and the antenna 726 may be attached to a thin plastic plate or a resin film.

Also, of course, the RF tag sheets 700, 720 of the present disclosure may be used for an RFID reader/writer including an antenna that radiates a linearly polarized radio wave.

In addition, the RF tag sheets 700, 720 of the present disclosure may also be used for an application different from that of the reading apparatus described above. For example, the RF tag sheets 700, 720 may be used in a position information acquisition system in which an antenna of an RFID reader/writer is installed on a ceiling or the like of each room in a building having a plurality of rooms. When each person in the building wears the RF tag sheet of the present disclosure, the position information acquisition system can acquire the position information of each person.

Each reading apparatus for reading information from an RF tag according to each embodiment reduces the possibility of failing to read information from an RF tag above the reading apparatus, prevents accidentally reading information from an RF tag around the reading apparatus, and improves the ease of use of the reading apparatus. For example, in the reading apparatuses 1 to 4 according to the first to third embodiments, since there is no radio wave absorbing wall, it is possible to easily place an article or a shopping basket on the placement portion 111. In addition, for example, in the reading apparatus 5 according to the fourth embodiment and the reading apparatus 6 according to the fifth embodiment, since the radio wave absorbing wall is low, it is possible to easily place an article or a shopping basket on the placement portion 111.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading apparatus reading information from a passive RF tag, comprising:

a top part, comprising:

a placement portion made of a material that allows radio waves to pass through without a material that blocks and/or reflects them and on which an article to which the RF tag is attached may be placed; and a prohibition portion made of a material that allows radio waves to pass through without a material that blocks and/or reflects them, surrounding the placement portion and on which the article is prohibited from being placed;

wherein there is a gap between an outer edge of the placement portion and an outer edge of the prohibition portion; and an antenna radiating a radio wave for communicating with the RF tag, being below the placement portion so that the radio wave propagates while spreading upward to reach the placement portion and the prohibition portion, and being located at a position where the radio wave with high intensity is radiated toward the placement portion and the radio wave with lower intensity than that of the radio wave radiated toward the placement portion is radiated toward the prohibition portion; wherein since there is the gap between the outer edge of the placement portion and the outer edge of the prohibition portion, there is a low possibility that the reading apparatus fails to read information from an RF tag placed on the upper surface of the placement portion and the reading apparatus can prevent accidentally reading information from an RF tag around the top part.

2. The reading apparatus according to claim 1, wherein since there is the gap between the outer edge of the placement portion and the outer edge of the prohibition portion, the intensity of the radio wave that is radiated by the antenna and reaches the RF tag on the placement portion is larger than predetermined intensity, and the intensity of the radio wave that is radiated by the antenna and reaches the RF tag around the top part is the intensity that does not allow the RF tag to operate.

3. The reading apparatus according to claim 1, wherein since there is the gap between the outer edge of the placement portion and the outer edge of the prohibition portion, there is a difference between the intensity of the radio wave that is radiated by the antenna and reaches the RF tag on the placement portion and the intensity of the radio wave that is radiated by the antenna and reaches the RF tag around the top part, and as a result, the reading apparatus can determine whether the RF tag is on the placement portion or the RF tag is around the top part.

4. The reading apparatus according to claim 1, wherein the placement portion is circular, the antenna radiates a circularly polarized radio wave, and the antenna is placed so that the center of a radiation area of the radio wave is located directly below the center of the placement portion.

5. The reading apparatus according to claim 1, further comprising:

a radio wave absorbing wall whose inner surface is in contact with the outer edge of the top part, extending above and below the top part, and absorbing radio waves;

wherein since there is the gap between the outer edge of the placement portion and the outer edge of the prohibition portion and there is the radio wave absorbing wall, there is a low possibility that the reading apparatus fails to read information from an RF tag placed on the upper surface of the placement portion and the reading apparatus can prevent accidentally reading information from an RF tag around the top part.

6. The reading apparatus according to claim 5, wherein since there is the gap between the outer edge of the placement portion and the outer edge of the prohibition portion and there is the radio wave absorbing wall, the intensity of the radio wave that is radiated by the antenna and reaches the RF tag on the placement portion is larger than predetermined intensity, and the intensity of the radio wave that is radiated by the antenna and reaches the RF tag around the top part is the intensity that does not allow the RF tag to operate.

7. The reading apparatus according to claim 5, wherein since there is the gap between the outer edge of the placement portion and the outer edge of the prohibition portion and there is the radio wave absorbing wall, there is a difference between the intensity of the radio wave that is radiated by the antenna and reaches the RF tag on the placement portion and the intensity of the radio wave that is radiated by the antenna and reaches the RF tag around the top part, and as a result, the reading apparatus can determine whether the RF tag is on the placement portion or the RF tag is around the top part.

8. The reading apparatus according to claim 5, wherein the placement portion is circular, the antenna radiates a circularly polarized radio wave, and the antenna is placed so that the center of a radiation area of the radio wave is located directly below the center of the placement portion.

* * * * *